(12) United States Patent
Nakata et al.

(10) Patent No.: US 8,447,486 B2
(45) Date of Patent: May 21, 2013

(54) BRAKE CONTROL APPARATUS AND CONTROL METHOD FOR THE BRAKE CONTROL APPARATUS

(75) Inventors: Daisuke Nakata, Toyota (JP); Takahiro Okano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 779 days.

(21) Appl. No.: 12/668,679

(22) PCT Filed: Jul. 16, 2008

(86) PCT No.: PCT/IB2008/001850
§ 371 (c)(1), (2), (4) Date: Jan. 12, 2010

(87) PCT Pub. No.: WO2009/010856
PCT Pub. Date: Jan. 22, 2009

(65) Prior Publication Data
US 2010/0211282 A1 Aug. 19, 2010

(30) Foreign Application Priority Data

Jul. 17, 2007 (JP) ................................. 2007-185645

(51) Int. Cl.
*B60T 8/34* (2006.01)
(52) U.S. Cl.
USPC ..... 701/70; 303/9.62; 303/122.03; 303/113.5
(58) Field of Classification Search
USPC ................. 701/1, 70; 303/3, 9.62, 9.63, 9.65, 303/122.03, 122.09, 113.1, 113.5, 33; 188/1.11, 188/151, 158
See application file for complete search history.

(56) References Cited

U.S. PATENT DOCUMENTS

| | | | |
|---|---|---|---|
| 7,338,136 B2* | 3/2008 | Nakayama et al. | 303/3 |
| 7,549,710 B2* | 6/2009 | Takenouchi et al. | 303/9.64 |
| 7,673,948 B2* | 3/2010 | Otomo | 303/114.1 |
| 7,708,354 B2* | 5/2010 | Ohkubo et al. | 303/87 |
| 2002/0149259 A1* | 10/2002 | Otomo et al. | 303/3 |
| 2007/0114842 A1 | 5/2007 | Ohkubo et al. | |
| 2007/0252428 A1* | 11/2007 | Okano et al. | 303/113.1 |
| 2007/0284935 A1* | 12/2007 | Nomura et al. | 303/3 |
| 2008/0001474 A1* | 1/2008 | Takenouchi et al. | 303/119.2 |

FOREIGN PATENT DOCUMENTS

| | | |
|---|---|---|
| CN | 1966321 A | 5/2007 |
| EP | 1 787 881 | 5/2007 |
| JP | 2002 29405 | 1/2002 |
| JP | 2003 76429 | 3/2003 |
| JP | 2003 154930 | 5/2003 |
| JP | 2003 270073 | 9/2003 |

(Continued)

*Primary Examiner* — Thomas Black
*Assistant Examiner* — Ce Li
(74) *Attorney, Agent, or Firm* — Oblon, Spivak, McClelland, Maier & Neustadt, L.L.P.

(57) ABSTRACT

In a brake control apparatus that controls braking forces which are applied to wheels based on the pressure of the hydraulic fluid, when the pressure detected by a control pressure sensor (73) is equal to or higher than a predetermined value while a partition valve (60) is closed, a master cut valve (64) is closed to suppress an increase in the pressure in a first passage (45) in a first hydraulic circuit (37), to which the control pressure sensor (73) is connected. Alternatively, the control pressure sensor (73) is protected against overpressure by opening the outlet valve (56,57) or the pressure-decreasing valve (67).

20 Claims, 9 Drawing Sheets

FOREIGN PATENT DOCUMENTS

| | | |
|---|---|---|
| JP | 2006 21669 | 1/2006 |
| JP | 2006 123889 | 5/2006 |
| JP | 2006 199089 | 8/2006 |
| JP | 2006 240366 | 9/2006 |
| JP | 2007 112160 | 5/2007 |
| JP | 2008 6850 | 1/2008 |

* cited by examiner

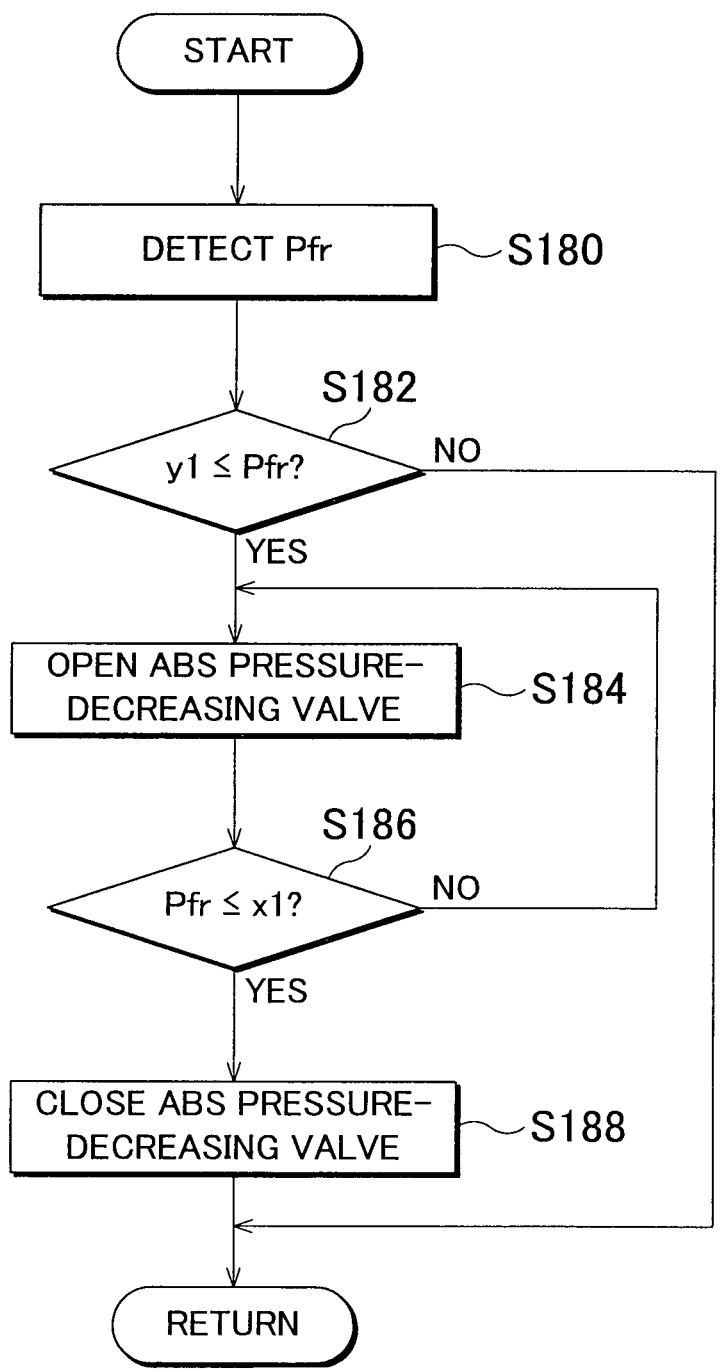

BRAKE CONTROL APPARATUS AND CONTROL METHOD FOR THE BRAKE CONTROL APPARATUS

BACKGROUND OF THE INVENTION

1. Field of the Invention

The invention relates generally to a brake control apparatus that controls braking forces that are applied to wheels of a vehicle, and, more specifically to a technology for protecting a pressure sensor included in the brake control apparatus.

2. Description of the Related Art

There is a hydraulic control apparatus that generates a hydraulic pressure corresponding to an operation amount of a brake pedal in a hydraulic circuit, and supplies the hydraulic pressure generated in the hydraulic circuit to wheel cylinders, thereby applying braking forces to wheels of a vehicle. Also, there is a hydraulic control apparatus that is provided with an actuator which includes a pair of electromagnetically-controlled valves that are used to increase or decrease the pressures in wheel cylinders fitted to respective wheels, and an electronic control unit that controls the actuator. With the hydraulic control apparatus, an amount by which a brake pedal is operated by a driver is detected by, for example, a sensor, and translated into an electric signal. Then, the electric signal indicating the operation amount of the brake pedal is transmitted to the electronic control unit. Then, the electronic control unit controls the electromagnetically-controlled valves used to increase or decrease the hydraulic pressures in the wheel cylinders, whereby the hydraulic pressures in the wheel cylinders fitted to the four respective wheels of the vehicle are controlled individually in the optimum manner. As a result, it is possible to secure high levels of running stability and safety. A system in which an operation performed by a driver is translated into an electric signal and braking forces are controlled based on the electric signal is generally called a "brake-by-wire" system.

Japanese Patent Application Publication No. 2006-123889 (JP-A-2006-123889) describes a hydraulic brake control apparatus which is an example of the hydraulic control apparatus described above. When detecting a certain type of malfunction, the hydraulic brake control apparatus described in JP-A-2006-123889 closes a partition valve, which separates a front wheel-side system from a rear wheel-side system, to provide communication between a hydraulic booster and the wheel cylinders, and performs a braking operation directly using the hydraulic pressure generated in response to the operation of the brake pedal performed by the driver.

The hydraulic brake control apparatus described in JP-A-2006-123889 includes a pressure sensor that detects the pressure in the hydraulic circuit. When receiving an excessively-high pressure, a commonly-used pressure sensor may fail to operate properly. Therefore, in the above-described hydraulic brake control apparatus that has a mode in which a hydraulic pressure is generated, directly in the wheel cylinders in response to a brake pedal operation performed by the driver, the hydraulic pressure may become considerably high if the driver performs an operation in a certain manner. Therefore, a pressure sensor that withstands a higher pressure needs to be employed in the hydraulic brake control apparatus described in JP-A-2006-123889. Accordingly, such hydraulic brake control apparatus reduces a degree of flexibility in designing a pressure sensor and causes cost increases.

In order to address these problems, Japanese Patent Application Publication No. JP-2006-199089 (JP-A-2006-199089) describes a brake control apparatus for a two-wheeled motor vehicle. With the brake control apparatus, when the pressure of hydraulic fluid exceeds the upper limit of permissible hydraulic pressure due to a brake operation, the hydraulic fluid is temporarily introduced into an accumulator of a relief valve unit. Thus, the pressure in a passage near a pressure sensor is decreased, and therefore the pressure sensor is protected.

However, in the brake control apparatus for a two-wheeled motor vehicle described in JP-A-2006-199089, a brake is applied to the front wheel by a brake lever and a brake is applied to the rear wheel by a brake pedal, and a hydraulic circuit for the front wheel and a hydraulic circuit for the rear wheel are separately formed. Therefore, relief valve units need to be provided in the respective hydraulic circuits, which increases the number of components. Also, if the permissible value varies with each pressure sensor, relief valves configured differently based on the permissible values need to be provided. This complicates the design of the brake control apparatus. In addition, there are various types of brake control apparatuses that use hydraulic pressure to apply brakes. Accordingly, various types of technologies for protecting pressure sensors are required.

SUMMARY OF THE INVENTION

The invention provides a brake control apparatus that protects a pressure sensor from a pressure increase to suppress occurrence of a malfunction in the pressure sensor.

An aspect of the invention relates to a brake control apparatus that controls braking forces which are applied to wheels based on a pressure of hydraulic fluid. The brake control apparatus includes: a manual hydraulic pressure source that pressurizes hydraulic fluid based on an amount by which a brake operation member is operated by a driver; a first hydraulic circuit which connects a first wheel cylinder that applies a braking force to a first wheel to the manual hydraulic pressure source, and in which a passage is formed so that a pressure of the hydraulic fluid in the manual hydraulic pressure source is transferred to the first wheel cylinder; a second hydraulic circuit which connects a second wheel cylinder that applies a braking force to a second wheel, which differs from the first wheel, to the manual hydraulic pressure source, and in which a passage is formed so that the pressure of the hydraulic fluid in the manual hydraulic pressure source is transferred to the second wheel cylinder; a partition valve that is provided in a main passage which provides communication between the first hydraulic circuit and the second hydraulic circuit; a first pressure sensor that detects a pressure in the main passage at a position on the first hydraulic circuit side with respect to the partition valve; and suppression means for suppressing an increase in a pressure in the passage in the first hydraulic circuit, to which the first pressure sensor is connected, when the pressure detected by the first pressure sensor is equal to or higher than a predetermined value while the partition valve is closed.

When the partition valve is closed, the pressure in the first hydraulic circuit tends to increase because a flow of the hydraulic fluid from the first hydraulic circuit to the second hydraulic circuit through the main passage is shut off. Therefore, for example, if the hydraulic fluid is pressurized in the manual hydraulic pressure source in accordance with the operation performed by the driver and an excessive pressure that exceeds a withstanding pressure limit for the first pressure sensor is generated in the first hydraulic circuit, a malfunction may occur in the first pressure sensor. Therefore, according to the aspect of the invention described above, when the pressure detected by the first pressure sensor is equal to or higher than the predetermined value while the partition valve is closed, the increase in the pressure in the passage in the first hydraulic circuit, to which the first pressure sensor is connected, is suppressed.

The suppression means may include: a first cut valve that is provided in the first hydraulic circuit at a position between the manual hydraulic pressure source and the first pressure sensor; and a control unit that compares a detection value that indicates the pressure detected by the first pressure sensor with a predetermined value, and closes the first cut valve when the detection value is equal to or higher than the predetermined value. Therefore, the first cut valve is closed when the detection value from the first pressure sensor is equal to or higher then the predetermined value. Accordingly, the hydraulic fluid that is pressurized in the manual hydraulic pressure source no longer flows into the passage which is downstream of the first cut valve and to which the first pressure sensor is connected. As a result, the increase in the pressure in the passage is suppressed.

The control unit may include a storage unit that stores a detection upper limit pressure value for the first pressure sensor as the predetermined value. Usually, the detection upper limit pressure value, which is the upper limit of the pressure that can be accurately detected by a pressure sensor, is set to a value lower than the withstanding pressure limit, which is the upper limit of the pressure at which it is ensured that the pressure sensor operates properly without any malfunction. Therefore, if the predetermined value at which the suppression means is actuated is set to the detection upper limit pressure value, it is possible to more reliably suppress occurrence of a malfunction in the pressure sensor. More preferably, the control unit stores a value that is lower than the detection upper limit pressure value by several MPa in the storage unit as the predetermined value.

The manual hydraulic pressure source may include a first pressure generation unit that generates a first pressure based on the amount by which the brake operation member is operated, and a second pressure generation unit that generates a second pressure that corresponds to a value obtained by multiplying the first pressure by a predetermined ratio. The brake control apparatus may further include a second pressure sensor that is provided in the second hydraulic circuit, and that detects the second pressure. The control unit may estimate the first pressure based on a detection value that indicates the second pressure detected by the second pressure sensor and the predetermined ratio, and open the first cut valve, which has been closed, when the difference between the estimated first pressure and the pressure detected by the first pressure sensor is smaller than a predetermined threshold value.

When the first cut valve is closed, the pressure that is generated at a position upstream of the first cut valve by the hydraulic fluid which is pressurized in the manual hydraulic pressure source is not accurately detected by the first pressure sensor. In contrast, with the configuration described above, it is possible to estimate the pressure that is generated at a position upstream of the first cut valve based on the detection value from the second pressure sensor provided on the second hydraulic circuit side and the predetermined ratio, because the manual hydraulic pressure source includes the first pressure generation unit that generates the first pressure based on the amount by which the brake operation member is operated, and the second pressure generation unit that generates the second pressure that corresponds to the value obtained by multiplying the first pressure by a predetermined ratio. Then, the first cut valve, which has been closed, is opened, when the difference between the estimated first pressure and the pressure detected by the first pressure sensor is smaller than the predetermined threshold value. Therefore, it is possible to suppress abrupt movement of the hydraulic fluid due to the pressure difference between the upstream side and the downstream side of the first cut valve, and thereby to suppress vibration due to pulsation of the hydraulic fluid, when the first cut valve is opened.

The brake control apparatus may further include vehicle deceleration detection means for detecting an actual deceleration of a vehicle that is in motion. The control unit may end the state in which the increase in the pressure in the passage, to which the first pressure sensor is connected, is suppressed by the suppression means, when the difference between an estimated vehicle deceleration that is estimated based on the pressure detected by the first pressure sensor and the actual deceleration is larger than a predetermined value in the state in which the increase in the pressure is suppressed by the suppression means. Thus, when the actual deceleration is smaller than the estimated deceleration and it is determined that a required deceleration has not been achieved, suppression of an increase in the pressure is ended and an increase in the pressure in the first wheel cylinder is permitted in order to more reliably secure the braking force, that is applied to the first wheel.

The control unit may open the partition valve, which has been closed, to end the state in which the increase in the pressure is suppressed by the suppression means. Thus, an increase in the pressure in the second wheel cylinder is permitted to increase the braking force that is applied to the second wheel.

The brake control apparatus may further include: a second cut valve that is provided in the second hydraulic circuit at a position between the manual hydraulic pressure source and the partition valve; and a pressure control mechanism that controls a pressure of hydraulic fluid that is transferred to at least one of the first wheel cylinder and the second wheel cylinder independently of an operation of the brake operation member performed by the driver. The control unit may control the braking forces that are applied to the wheels by closing the first cut valve and the second cut valve and opening the partition valve when the pressure of the hydraulic fluid is controlled by the pressure control mechanism, and by opening the first cut valve and the second cut valve and closing the partition valve when an abnormal condition is detected in control over the pressure of the hydraulic fluid executed by the pressure control mechanism. Because the first cut valve and the second cut valve are closed when the pressure of the hydraulic fluid is controlled by the pressure control mechanism, even if the hydraulic pressure is excessively pressurized in the manual hydraulic pressure source in accordance with the operation performed by the driver, the pressure is not transferred directly to the first pressure sensor. Therefore, it is possible to suppress the increase in the pressure in the passage in the first hydraulic circuit, to which the first pressure sensor is connected.

The pressure control mechanism may include a power hydraulic pressure source that delivers the hydraulic fluid which is pressurized by supplied drive power independently of the operation of the brake operation member, a pressure-increasing valve that is provided downstream of the power hydraulic pressure source, and the pressure-decreasing valve that is provided downstream of the pressure-increasing valve. The main passage may provide communication between the pressure-increasing valve and the pressure-decreasing valve. The control unit may suppress the increase in the pressure in the passage, to which the first pressure sensor is connected, by opening the partition valve and the pressure-decreasing valve when the pressure detected by the first pressure sensor is equal to or higher than the predetermined value while the first cut valve and the second cut valve are open and the partition valve is closed so that the braking forces are applied to the wheels using the pressure generated in the manual hydraulic pressure source. Thus, when the detection value from the first pressure sensor is equal to or higher than the predetermined value, the partition valve and the pressure-decreasing valve are opened and therefore the hydraulic fluid that is pressurized in the manual hydraulic pressure source flows out through the pressure-decreasing valve. Accordingly, it is possible to suppress an increase in the pressure in the passage to which the first pressure sensor is connected.

The invention may be implemented in various other aspects such as a method, a program, a system and a vehicle.

According to the aspect of the invention described above, it is possible to protect the pressure sensor from a pressure increase to suppress occurrence of a malfunction in the pressure sensor.

BRIEF DESCRIPTION OF THE DRAWINGS

The foregoing and further features and advantages of the invention will become apparent from the following description of example embodiments with reference to the accompanying drawings, wherein the same or corresponding portions will be denoted by the same reference numerals and wherein:

FIG. 9 is a flowchart describing a routine for protecting the control pressure sensor when the pressure increases in the hydro-booster mode according to a third embodiment of the invention.

DETAILED DESCRIPTION OF THE EMBODIMENTS

Figure 1:
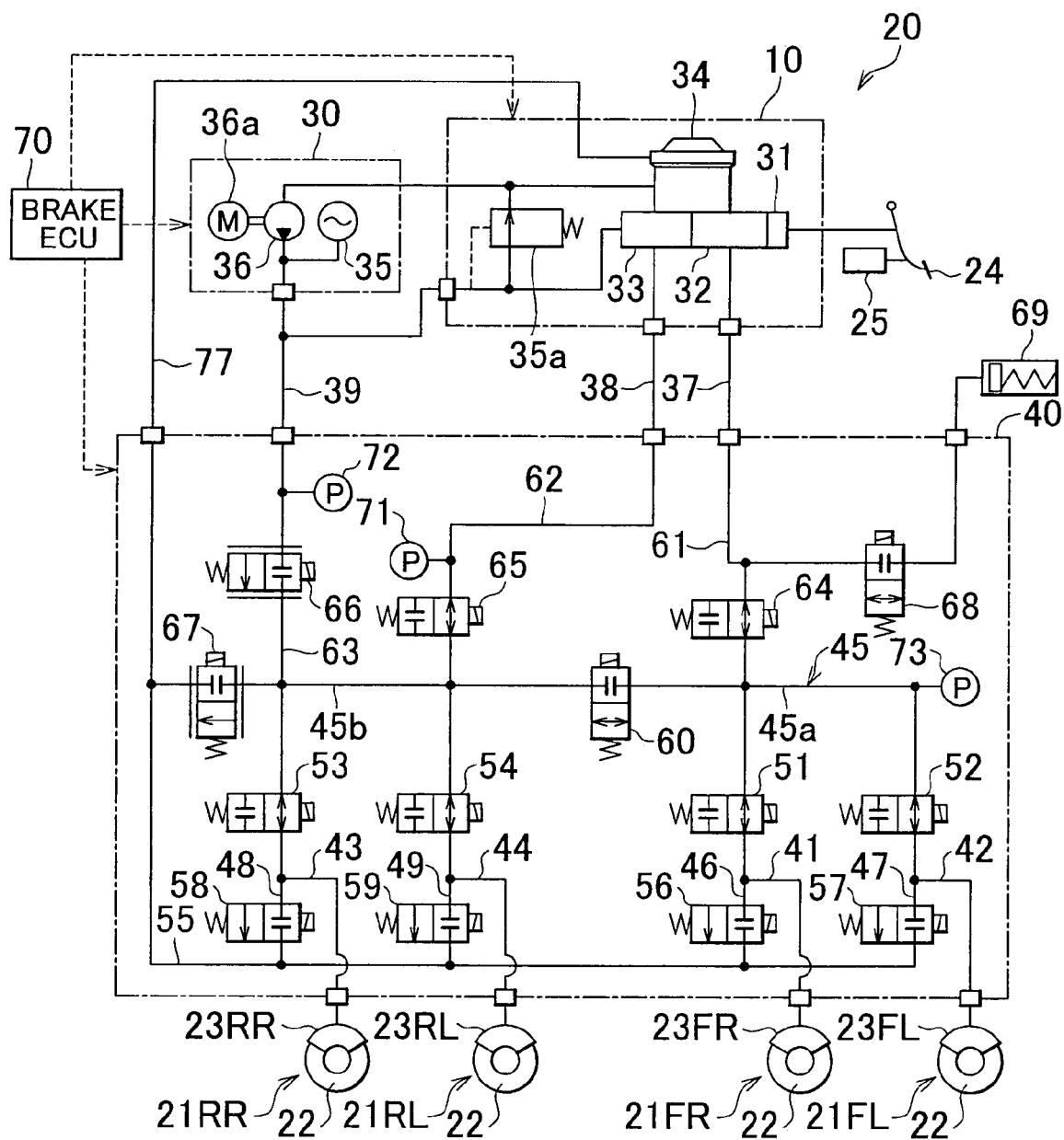
FIG. 1 is a system diagram showing a brake control apparatus according to a first embodiment of the invention.

Hereafter, example embodiments of the invention will be described with reference to the accompanying drawings. In the description below, the same or corresponding portions will be denoted by the same reference numerals. The description concerning the portions having the same reference numerals will be provided only once below.

First Embodiment of the Invention

FIG. 1 is a system diagram showing a brake control apparatus 20 according to a first embodiment of the invention. The brake control apparatus 20 shown in FIG. 1 forms an electronically-controlled brake system for a vehicle, and controls braking forces that are applied to four wheels of a vehicle. The brake control apparatus 20 according to the first embodiment of the invention is mounted on, for example, a hybrid vehicle provided with an electric motor and an internal combustion engine that serve as drive power sources. In a hybrid vehicle, braking force may be applied to the vehicle through a regenerative braking operation in which kinetic energy of the vehicle is converted into electric energy and stored or a hydraulic pressure braking operation executed by the brake control apparatus 20. In the vehicle in the first embodiment of the invention, it is also possible to execute a cooperative braking control to generate desired braking force through combined execution of the regenerative braking operation and the hydraulic pressure braking operation.

As shown in FIG. 1, the brake control apparatus 20 includes disc brake units 21FR, 21FL, 21RR and 21RL that are fitted to respective four wheels, a master cylinder unit 10, a power hydraulic pressure source 30, and a hydraulic actuator 40.

The disc brake units 21FR, 21FL, 21RR and 21RL apply braking forces to a right front wheel, a left front wheel, a right rear wheel and a left rear wheel of the vehicle, respectively. The master cylinder unit 10, which serves as a manual hydraulic pressure source, delivers brake fluid pressurized in accordance with the operation amount of a brake pedal 24 that serves as a brake operating member to the disc brake units 21FR, 21FL, 21RR and 21RL. The power hydraulic pressure source 30 delivers the brake fluid, used as the hydraulic fluid and pressurized by supplied power, to the disc brake units 21FR, 21FL, 21RR and 21RL independently of any operations of the brake pedal 24. The hydraulic actuator 40 adjusts, on an as-required basis, the hydraulic pressure of the brake fluid supplied from the power hydraulic pressure source 30 or the master cylinder unit 10, and then delivers the brake fluid to the disc brake units 21FR, 21FL, 21RR and 21RL. Thus, the braking forces that are applied to the respective wheels through the hydraulic pressure braking operation are adjusted. In the first embodiment of the invention, a wheel cylinder pressure control system is formed of the power hydraulic pressure source 30, the hydraulic actuator 40, etc.

The disc brake units 21FR, 21FL, 21RR and 21RL, the master cylinder unit 10, the power hydraulic pressure source 30, and the hydraulic actuator 40 will be described below in more detail. The disc brake units 21FR, 21FL, 21RR and 21RL include brake discs 22, and wheel cylinders 23FR, 23FL, 23RR and 23RL incorporated in brake calipers, respectively. The wheel cylinders 23FR to 23RL are connected to the hydraulic actuator 40 via respective fluid passages. Hereinafter, the wheel cylinders 23FR to 23RL will be collectively referred to as the "wheel cylinders 23", where appropriate. As described above, the hydraulic actuator 40 serves as a hydraulic circuit formed of multiple fluid passages that provide communication between the power hydraulic pressure source 30 or the master cylinder unit 10 and the wheel cylinders 23 and that transfer the hydraulic pressure of the brake fluid in the power hydraulic pressure source 30 or the master cylinder unit 10 to the wheel cylinders 23.

In the disc brake units 21FR, 21FL, 21RR and 21RL, when the brake fluid is supplied from the hydraulic actuator 40 to the wheel cylinders 23, brake pads that serve as friction members are pressed to the brake discs 22 that rotate together with the wheels. Thus, braking force is applied to each wheel. In the first embodiment of the invention, the disc brake units 21FR to 21RL are used. Alternatively, other braking force applying mechanisms including wheel cylinders, for example, drum brake units may be used.

In the first embodiment of the invention, the master cylinder unit 10 is provided with a hydraulic pressure booster. The master cylinder unit 10 includes a hydraulic pressure booster 31, a master cylinder 32, a regulator 33, and a reservoir 34. The hydraulic pressure booster 31 is connected to the brake pedal 24. The hydraulic pressure booster 31 amplifies the pedal depression force applied to the brake pedal 24, and then transfers the amplified pedal depression force to the master cylinders 32. Thus, the hydraulic fluid is pressurized. The pedal depression force is amplified by supplying the brake fluid from the power hydraulic pressure source 30 to the hydraulic pressure booster 31 through the regulator 33. Then, the master cylinder 32 generates master cylinder pressure corresponding to a value obtained by amplifying the pedal depression force by predetermined number of times.

The reservoir 34 that stores the brake fluid is provided above the master cylinder 32 and the regulator 33. The master cylinder 32 communicates with the reservoir 34 when the brake pedal 24 is not depressed. The regulator 33 communicates with both the reservoir 34 and an accumulator 35 of the power hydraulic pressure source 30. The regulator 33 generates a fluid pressure that corresponds to a value obtained by multiplying the master cylinder pressure by a predetermined ratio using the reservoir 34 as a low-pressure source and the accumulator 35 as a high-pressure source. Hereinafter, the hydraulic pressure in the regulator 33 will be referred to as the "regulator pressure" where appropriate.

The power hydraulic pressure source 30 includes the accumulator 35 and a pump 36. The accumulator 35 converts the pressure energy of the brake fluid pressurized by the pump 36 into the pressure energy of the filler gas such as nitrogen, for example, the pressure energy having a pressure of approximately 14 MPa to approximately 22 MPa, and stores the pressure energy. The pump 36 has a motor 36a that serves as a drive power source. An inlet of the pump 36 is connected to the reservoir 34, and an outlet thereof is connected to the accumulator 35. The accumulator 35 is connected also to a relief valve 35a provided in the master cylinder unit 10. When the pressure of the brake fluid in the accumulator 35 abnormally increases and becomes, for example, approximately 25 MPa, the relief valve 35a opens, and the brake fluid having a high pressure is returned to the reservoir 34.

As described above, the brake control apparatus 20 includes the master cylinder 32, the regulator 33, and the accumulator 35 that serve as brake fluid supply sources from which the brake fluid is supplied to the wheel cylinders 23. A master pipe 37 is connected to the master cylinder 32. A regulator pipe 38 is connected to the regulator 33. An accumulator pipe 39 is connected to the accumulator 35. The master pipe 37, the regulator pipe 38 and the accumulator pipe 39 are connected to the hydraulic actuator 40.

The hydraulic actuator 40 includes an actuator block having a plurality of passages formed therein, and a plurality of electromagnetically-controlled valves. Examples of the passages formed in the actuator block include individual passages 41, 42, 43 and 44 and a main passage 45. The individual passages 41, 42, 43 and 44 branch off from the main passage 45, and are connected to the wheel cylinders 23FR, 23FL, 23RR and 23RL of the disc brake units 21FR, 21FL, 21RR and 21RL, respectively. Thus, communication is provided between the wheel cylinders 23 and the main passage 45.

ABS maintaining valves 51, 52, 53 and 54 are provided at the middle portions of the individual passages 41, 42, 43 and 44, respectively. Each of the ABS maintaining valves 51, 52, 53 and 54 includes a solenoid subjected to the ON/OFF control and a spring, and is a normally-open electromagnetically-controlled valve that is open when electric power is not supplied to the solenoid. Each of the ABS maintaining valves 51 to 54 allows the brake fluid to flow in either direction, when it is open. Namely, each of the ABS maintaining valves 51 to 54 allows the brake fluid to flow from the main passage 45 to the wheel cylinders 23, and also allows the brake fluid to flow from the wheel cylinders 23 to the main passage 45. When electric power is supplied to the solenoids and the ABS maintaining valves 51 to 54 are closed, the flow of the brake fluid through the individual passages 41 to 44 is shut off.

In addition, the wheel cylinders 23 are connected to a reservoir passage 55 via pressure-decreasing passages 46, 47, 48 and 49 connected to the individual passages 41, 42, 43 and 44, respectively. ABS pressure-decreasing valves 56, 57, 58 and 59 are provided at the middle portions of the pressure-decreasing passages 46, 47, 48 and 49, respectively. Each of the ABS pressure-decreasing valves 56 to 59 includes a solenoid subjected to the ON/OFF control and a spring, and is a normally-closed electromagnetically-controlled valve that is closed when electric power is not supplied to the solenoid. When the ABS pressure-decreasing valves 56 to 59 are closed, the flow of the brake fluid through the pressure-decreasing passages 46 to 49 is shut off. When electric power is supplied to the solenoids and the ABS pressure-decreasing valves 56 to 59 are opened, the brake fluid flows through the pressure-decreasing passages 46 to 49, and the brake fluid is returned from the wheel cylinders 23 to the reservoir 34 through the pressure-decreasing passages 46 to 49 and the reservoir passage 55. The reservoir passage 55 is connected to the reservoir 34 of the master cylinder unit 10 via a reservoir pipe 77.

A partition valve 60 is provided at the middle portion of the main passage 45. The main passage 45 is partitioned into a first passage 45a that is connected to the individual passages 41 and 42, and a second passage 45b that is connected to the individual passages 43 and 44, when the partition valve 60 is closed. The first passage 45a is connected to the wheel cylinders 23FR and the 23FL for the front wheels via the individual passages 41 and 42, respectively. The second passage 45b is connected to the wheel cylinders 23RR and 23RL for the rear wheels via the individual passages 43 and 44, respectively.

The partition valve 60 includes a solenoid subjected to the ON/OFF control and a spring, and is a normally-closed electromagnetically-controlled valve that is closed when electric power is not supplied to the solenoid. When the partition valve 60 is closed, the flow of the brake fluid through the main passage 45 is shut off. When electric power is supplied to the solenoid and the partition valve 60 is opened, the brake fluid flows between the first passage 45a and the second passage 45b in either direction. That is, the partition valve 60 controls the flow of the hydraulic fluid between the first passage 45a and the second passage 45b.

In the hydraulic actuator 40, a master passage 61 and a regulator passage 62, which communicate with the main passage 45, are formed. More specifically, the master passage 61 is connected to the first passage 45a of the main passage 45, and the regulator passage 62 is connected to the second passage 45b of the main passage 45. The master passage 61 is connected to the master pipe 37 that communicates with the master cylinder 32. The regulator passage 62 is connected to the regulator pipe 38 that communicates with the regulator 33.

A master cut valve 64 is provided at the middle portion of the master passage 61. The master cut valve 64 includes a solenoid subjected to the ON/OFF control and a spring, and is a normally-open electromagnetically-controlled valve that is open when electric power is not supplied to the solenoid. When the master cut valve 64 is open, the brake fluid flows between the master cylinder 32 and the first passage 45a of the main passage 45 in either direction. When electric power is supplied to the solenoid and the master cut valve 64 is closed, the flow of the brake fluid through the master passage 61 is shut off.

A stroke simulator 69 is connected to the master passage 61 via a simulator cut valve 68, at a position upstream of the master cut valve 64. Namely, the simulator cut valve 68 is provided on the passage that connects the master cylinder 32 to the stroke simulator 69. The simulator cut valve 68 includes a solenoid subjected to the ON/OFF control and a spring, and is a normally-closed electromagnetically-controlled valve that is closed when electric power is not supplied to the solenoid. When the simulator cut valve 68 is closed, the flow of the brake fluid through the master passage 61 between the simulator cut valve 68 and the stroke simulator 69 is shut off. When electric power is supplied to the solenoid and the simulator cut valve 68 is opened, the brake fluid flows between the master cylinder 32 and the stroke simulator 69 in either direction.

The stroke simulator 69 includes a plurality of pistons and a plurality of springs. When the simulator cut valve 68 is opened, the stroke simulator 69 generates a reaction force corresponding to the depression force applied to the brake pedal 24 by a driver. Preferably, a stroke simulator that has multi-stage spring characteristics is used as the stroke simulator 69 in order to improve the brake pedal operating feel felt by the driver.

A regulator cut valve 65 is provided at the middle portion of the regulator passage 62. The regulator cut valve 65 also includes a solenoid subjected to the ON/OFF control and a spring, and is a normally-open electromagnetically-controlled valve that is open when electric power is not supplied to the solenoid. When the regulator cut valve 65 is open, the brake fluid flows between the regulator 33 and the second passage 45b of the main passage 45 in either direction. When electric power is supplied to the solenoid and the regulator cut valve 65 is closed, the flow of the brake fluid through the regulator passage 62 is shut off.

As described above, in the first embodiment of the invention, the master cylinder 32 of the master cylinder unit 10 is communicated with the wheel cylinders 23FR and 23FL for the front wheels by a first hydraulic circuit that is formed of the following elements. The first hydraulic circuit includes the master pipe 37, the master passage 61, the master cut valve 64, the first passage 45a of the main passage 45, the individual passages 41 and 42, and the ABS maintaining valves 51 and 52. The hydraulic-pressure booster 31 and the regulator 33 of the master cylinder unit 10 are communicated with the wheel cylinders 23RR and 23RL for the rear wheels by a second hydraulic circuit that is formed of the following elements. The second hydraulic circuit includes the regulator pipe 38, the regulator passage 62, the regulator cut valve 65, the second passage 45b of the main passage 45, the individual passages 43 and 44, and the ABS maintaining valves 53 and 54.

The hydraulic pressure in the master cylinder unit 10, which is increased in accordance with the amount by which the brake pedal is operated by the driver, is transferred to the wheel cylinders 23FR and 23FL for the front wheels through the first hydraulic circuit. The hydraulic pressure in the master cylinder unit 10 is transferred to the wheel cylinders 23RR and 23RL for the rear wheels through the second hydraulic circuit. Thus, it is possible to generate braking force corresponding to the brake pedal operation amount in each wheel cylinder 23. That is, each wheel cylinder 23 applies braking force to the wheel in response to a supply of brake fluid thereto.

In addition to the master passage 61 and the regulator passage 62, an accumulator passage 63 is formed in the hydraulic actuator 40. One end of the accumulator passage 63 is connected to the second passage 45b of the main passage 45, and the other end thereof is connected to the accumulator pipe 39 that communicates with the accumulator 35.

A pressure-increasing linear control valve 66 is provided at the middle portion of the accumulator passage 63. The accumulator passage 63 and the second passage 45b of the main passage 45 are connected to the reservoir passage 55 via a pressure-decreasing linear control valve 67. Each of the pressure-increasing linear control valve 66 and the pressure-decreasing linear control valve 67 has a linear solenoid and a spring, and is a normally-closed electromagnetically-controlled valve that is closed when electric power is not supplied to the linear solenoid. The opening amounts of the pressure-increasing linear control valve 66 and the pressure-decreasing control valve 67 are adjusted in proportion to the magnitudes of electric currents supplied to the respective linear solenoids.

The pressure-increasing linear control valve 66 is shared by the multiple wheel cylinders 23 corresponding to the respective wheels. Similarly, the pressure-decreasing linear control valve 67 is shared by the multiple wheel cylinders 23. Namely, according to the first embodiment of the invention, the pressure-increasing linear control valve 66 and the pressure-decreasing linear control valve 67 are provided as a pair of control valves that are shared by the wheel cylinders 23 and that control the hydraulic fluid supplied from the power hydraulic pressure source 30 to the wheel cylinders 23 and the hydraulic fluid returned from the wheel cylinders 23 to the power hydraulic pressure source 30.

The pressure difference between an inlet and an outlet of the pressure-increasing linear control valve 66 corresponds to the difference between the pressure of the brake fluid in the accumulator 35 and the pressure of the brake fluid in the main passage 45. The pressure difference between an inlet and an outlet of the pressure-decreasing linear control valve 67 corresponds to the difference between the pressure of the brake fluid in the main passage 45 and the pressure of the brake fluid in the reservoir 34. When the electromagnetic drive power corresponding to the electric power supplied to the linear solenoid of each of the pressure-increasing linear control valve 66 and the pressure-decreasing linear control valve 67 is F1, the biasing force of the spring of each of the pressure-increasing linear control valve 66 and the pressure-decreasing linear control valve 67 is F2, and the differential pressure acting force corresponding to the pressure difference between the inlet and the outlet of each of the pressure-increasing linear control valve 66 and the pressure-decreasing linear control valve 67 is F3, the equation, F1+F3=F2, is satisfied. Accordingly, the pressure difference between the inlet and the outlet of each of the pressure-increasing linear control valve 66 and the pressure-decreasing linear control valve 67 is controlled by continuously controlling the electric power supplied to the linear solenoid of each of the pressure-increasing linear control valve 66 and the pressure-decreasing linear control valve 67.

In the first embodiment of the invention, a pressure control mechanism is formed of the power hydraulic pressure source 30 that is able to deliver the brake fluid, which is pressurized by the drive power supplied thereto, independently of the operation of the brake pedal 24, the pressure-increasing linear control valve 66 that is arranged downstream of the power hydraulic pressure source 30, and the pressure-decreasing linear control valve 67 that is arranged downstream of the pressure-increasing linear control valve 66. The hydraulic pressure in each wheel cylinders 23 is controlled by operating the pressure control mechanism. Because the second passage 45b of the main passage 45 is formed between the pressure-increasing linear control valve 66 and the pressure-decreasing linear control valve 67, the pressure control mechanism is able to control the hydraulic pressure in the wheel cylinders 23RR and 23RL for the rear wheel regardless whether the partition valve 60 is open or closed. If the partition valve 60 is open, the hydraulic pressures in all the wheel cylinders 23 are controlled by operating the pressure control mechanism.

In the brake control apparatus 20, the power hydraulic pressure source 30 and the hydraulic actuator 40 are controlled by a brake ECU 70 that serves as a controller according to the first embodiment of the invention. The brake ECU 70 is formed of a microprocessor including a CPU. The brake ECU 70 includes, in addition to the CPU, a ROM that stores various programs, a RAM that temporarily stores data, an input port, an output port, a communication port, etc. The brake ECU 70 communicates with a hybrid ECU (not shown), etc. at a higher level. The brake ECU 70 is able to execute the cooperative braking control by controlling the pump 36 of the power hydraulic pressure source 30, the electromagnetically-controlled valves 51 to 54, 56 to 59, 60, and 64 to 68 that form the hydraulic actuator 40 based on the control signals from the hybrid ECU and the signals from various sensors.

A regulator pressure sensor 71, an accumulator pressure sensor 72, and a control pressure sensor 73 are connected to the brake ECU 70. The regulator pressure sensor 71 is provided upstream of the regulator cut valve 65. The regulator pressure sensor 71 detects the pressure of the brake fluid in the regulator passage 62, namely, the regulator pressure, and transmits a signal indicating the detected regulator pressure to the brake ECU 70. The accumulator pressure sensor 72 is provided upstream of the pressure-increasing linear control valve 66. The accumulator pressure sensor 72 detects the pressure of the brake fluid in the accumulator passage 63, namely, the accumulator pressure, and transmits a signal indicating the detected accumulator pressure to the brake ECU 70. The control pressure sensor 73 detects the pressure of the brake fluid in the first passage 45a of the main passage 45, and transmits a signal indicating the detected brake fluid pressure to the brake ECU 70. The first passage 45a is on one side of the partition valve 60. The signals indicating the values detected by the regulator pressure sensor 71, the accumulator pressure sensor 72, and the control pressure sensor 73 are transmitted to the braked ECU 70 at predetermined time intervals, and stored in a predetermined storage region of the brake ECU 70. In the first embodiment of the invention, each of the regulator pressure sensor 71, the accumulator pressure sensor 72 and the control pressure sensor 73 has a self-diagnosis function. Therefore, each of the regulator pressure sensor 71, the accumulator pressure sensor 72 and the control pressure sensor 73 determines whether a malfunction has occurred therein, and transmits a signal indicating whether a malfunction has occurred to the brake ECU 70.

When the partition valve 60 is open and the first passage 45a and the second passage 45b of the main passage 45 communicate with each other, the value output from the control pressure sensor 73 indicates the lower hydraulic pressure at the pressure-increasing linear control valve 66 and the higher hydraulic pressure at the pressure-decreasing linear control valve 67. Accordingly, the value output from the control pressure sensor 73 is used to control the pressure-increasing linear control valve 66 and the pressure-decreasing linear control valve 67. When the pressure-increasing linear control valve 66 and the pressure-decreasing linear control valve 67 are both closed and the master cut valve 64 is open, the value output from the control pressure sensor 73 indicates the master cylinder pressure. When the partition valve 60 is open and the first passage 45a and the second passage 45b of the main passage 45 communicate with each other, and the ABS maintaining valves 51 to 54 are open while the ABS pressure-decreasing valves 56 to 59 are closed, the value output from the control pressure sensor 73 indicates the hydraulic fluid pressure that is applied to each of the wheel cylinders 23, namely, the wheel cylinder pressure.

Examples of the sensors that are connected to the brake ECU 70 include a stroke sensor 25 fitted to the brake pedal 24. The stroke sensor 25 detects a brake pedal stroke that is an operation amount of the brake pedal 24, and transmits a signal indicating the detected brake pedal stroke to the brake ECU 70. The value output from the stroke sensor 25 is transmitted to the brake ECU 70 at predetermined time intervals, and stored in a predetermined storage region of the brake ECU 70.

The brake control apparatus 20 structured in the above-described manner may execute control in one of at least three control modes, that is, a cooperative braking control mode, a Reg mode, and a hydro-booster mode. When the vehicle is traveling normally, the brake control apparatus 20 controls braking force in the cooperative braking control mode. For example, when each sensor performs a self-diagnosis while the vehicle is stopped, the brake control apparatus 20 controls braking force in the Reg mode. If some sort of malfunction is detected in the brake control apparatus 20, the brake control apparatus 20 control braking force in the hydro-booster mode. In The hydro-booster mode, the hydraulic pressure that corresponds to the amount by which the brake pedal is operated by the driver is transferred to the wheel cylinders 23, whereby braking force is generated.

In each case, the brake control apparatus 20 starts a braking operation upon reception of a braking instruction. A braking instruction is issued when braking force should be applied to the vehicle. A braking instruction is issued, for example, when the driver operates the brake pedal 24, or when the distance between the host vehicle and another vehicle falls below a predetermined distance during automatic control over the distance between the host vehicle and the other vehicle.

Figure 2:
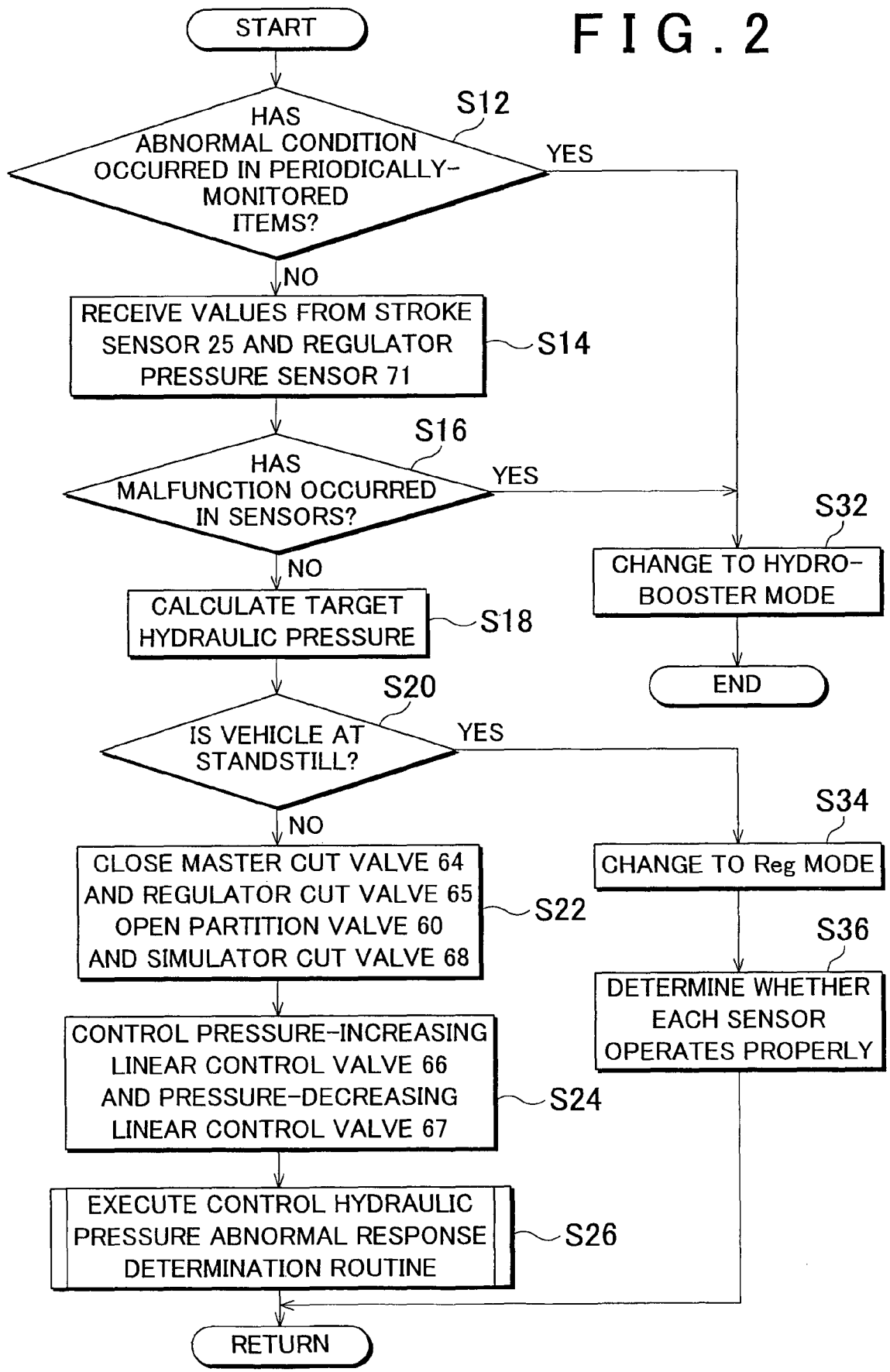
FIG. 2 is a flowchart describing a control routine that is executed in a cooperative braking control mode.

FIG. 2 is a flowchart describing a control routine that is executed in the cooperative braking control mode. In the cooperative braking control mode, the cooperative braking control is executed. The control routine shown in FIG. 2 is periodically executed at predetermined time intervals of, for example, several milliseconds after a braking instruction is issued in response to an operation of the brake pedal 24.

When the control routine in the cooperative braking control mode is started, first, the brake ECU 70 checks periodically-monitored items to determine whether an abnormal condition has occurred in the periodically-monitored items (S12). The periodically-monitored items include, for example, presence or absence of breakage and presence or absence of a short circuit in a wire arranged inside the brake control apparatus 20, and presence or absence of a malfunction in the power hydraulic pressure source 30 based on a value detected by the accumulator pressure sensor 72.

If it is determined that an abnormal condition has occurred in the periodically-monitored items ("YES" in S12), the brake ECU 70 changes the control mode from the cooperative braking control mode to the hydro-booster mode to end the cooperative braking control (S32). On the other hand, if it is determined that an abnormal condition has not occurred in the periodically-monitored items ("NO" in S12), the brake ECU 70 receives the values detected by the stroke sensor 25 and the regulator pressure sensor 71 (S14). The operation amount of the brake pedal 24 is detected by the stroke sensor 25, and the hydraulic pressure in the master cylinder unit 10, which is increased in accordance with depression of the brake pedal 24, is detected by the regulator pressure sensor 71.

Next, the brake ECU 70 determines whether a malfunction has occurred in the stroke sensor 25 and the regulator pressure sensor 71 based on the values detected by the stroke sensor 25 and the regulator pressure sensor 71 (S16). In the first embodiment of the invention, two stroke sensors 25 are provided in parallel with each other. The brake ECU 70 compares the values detected by these stroke sensors 25 with the value detected by the regulator pressure sensor 71 to determine whether there is a sensor that indicates an abnormal value. If there is a sensor that indicates an abnormal value different from the values indicated by the other two sensors, the brake ECU 70 determines that a malfunction has occurred in the sensor that indicates the abnormal value. If it is determined that a malfunction has occurred in one of the sensors ("YES" in S16), the brake ECU 70 changes the control mode from the cooperative braking control mode to the hydro-booster mode to end the cooperative braking control (S32).

On the other hand, if it is determined that a malfunction has occurred in neither the stroke sensor 25 nor the regulator pressure sensor 71 ("NO" in S16), the brake ECU 70 calculates a target hydraulic pressure for the wheel cylinders 23 (S18). In the calculation of the target hydraulic pressure, first, the brake ECU 70 calculates required the hydraulic pressure braking force, which is the braking force that should be generated by the brake control apparatus 20, by subtracting the regenerative braking force from the required total braking force. A signal indicating the regenerative braking force is transmitted from the hybrid ECU to the brake control apparatus 20. Then, the brake ECU 70 calculates the target hydraulic pressure for the wheel cylinders 23 based on the calculated required hydraulic pressure braking force.

Next, the brake ECU 70 determines whether the vehicle is at a standstill (S20). If it is determined that the vehicle has already been at a standstill ("YES" in S20), the brake ECU 70 changes the control mode from the cooperative braking control mode to the Reg mode (S34), and determines whether each sensor is operating properly. The brake ECU 70 determines whether each sensor is operating properly by comparing the values detected by the control pressure sensor 73, the regulator pressure sensor 71, and the stroke sensor 25 with each other.

When it is determined that the vehicle is at a standstill, it is not always necessary to change the control mode to the Reg mode and determine whether each sensor is operating properly. For example, the brake ECU 70 may determine whether each sensor is operating properly at an appropriate frequency, for example, once per several braking operations. When the determination as to whether each sensor is operating properly is completed, the control routine shown in FIG. 2 ends, and is executed in the same manner when the next execution timing is reached.

If it is determined that the vehicle is in motion ("NO" in S20), the brake ECU 70 keeps the master cut valve 64 and the regulator cut valve 65 closed, and keeps the partition valve 60 and the simulator cut valve 68 open (S22). Thus, the wheel cylinders 23 are shut off from the master cylinder unit 10, and allowed to receive the brake fluid supplied from the power hydraulic pressure source 30. The brake fluid that is delivered from the master cylinder 32 in response to a brake pedal operation performed by the driver is supplied to the stroke simulator 69, and a reaction force is generated based on the depression force applied to the brake pedal 24 by the driver. Thus, the brake pedal operating feel felt by the driver is appropriately maintained.

In this state, the brake ECU 70 controls the pressure-increasing linear control valve 66 and the pressure-decreasing linear control valve 67 based on the target hydraulic pressure (S24). More specifically, the brake ECU 70 controls electric currents that are supplied to the pressure-increasing linear control valve 66 and the pressure-decreasing linear control valve 67 to control the opening amounts of these valves. Then, the brake ECU 70 executes a control hydraulic pressure abnormal response determination routine for determining whether the hydraulic pressures in the wheel cylinders 23 are appropriately controlled (S26). The control hydraulic pressure abnormal response determination routine in S26 will be described later in detail with reference to FIGS. 3 and 4. Briefly, in this routine, it is determined whether the wheel cylinder pressure is properly controlled based on the value detected by the control pressure sensor 73. When the control hydraulic pressure abnormal response determination routine in S26 is completed, the control routine shown in FIG. 2 ends, and is executed in the same manner when the next execution timing is reached.

The control hydraulic pressure abnormal response determination routine in S26 will be described with reference to FIGS. 3 and 4. The control hydraulic pressure abnormal response determination routine in S26 is executed in order to determine whether the wheel cylinder pressure properly responds to the control after a braking instruction is issued. When the wheel cylinder pressure does not properly responds to the control, there is a possibility that the required braking force will not be applied to each wheel through the cooperative braking control. Therefore, the brake ECU 70 changes the control mode to the hydro-booster mode.

In the control hydraulic pressure abnormal response determination routine in S26, the brake ECU 70 determines the presence or absence of three types of abnormalities, that is, an abnormally-quick response, an abnormally-slow response, and poor control. An abnormally-quick response means that the control hydraulic pressure abruptly increases beyond the target hydraulic pressure because an improper-opening failure or a leakage has occurred in the pressure-increasing linear control valve 66 or the opening amount of the control valve cannot be linearly controlled. An abnormally-slow response means that the control hydraulic pressure rises abnormally slowly because an improper-closing failure has occurred in the pressure-increasing linear control valve 66 or the flow rate is inadequate. Poor control means the state in which the control hydraulic pressure does not match the target hydraulic pressure, for example, the state in which the deviation of the control hydraulic pressure from the target hydraulic pressure is larger than a reference deviation continuously for a predetermined reference time or longer. An improper-opening failure means that the valve is not closed when the valve should be closed and inappropriately kept open. An improper-closing failure means that the valve is not opened when the valve should be opened and inappropriately kept closed.

Figure 3:
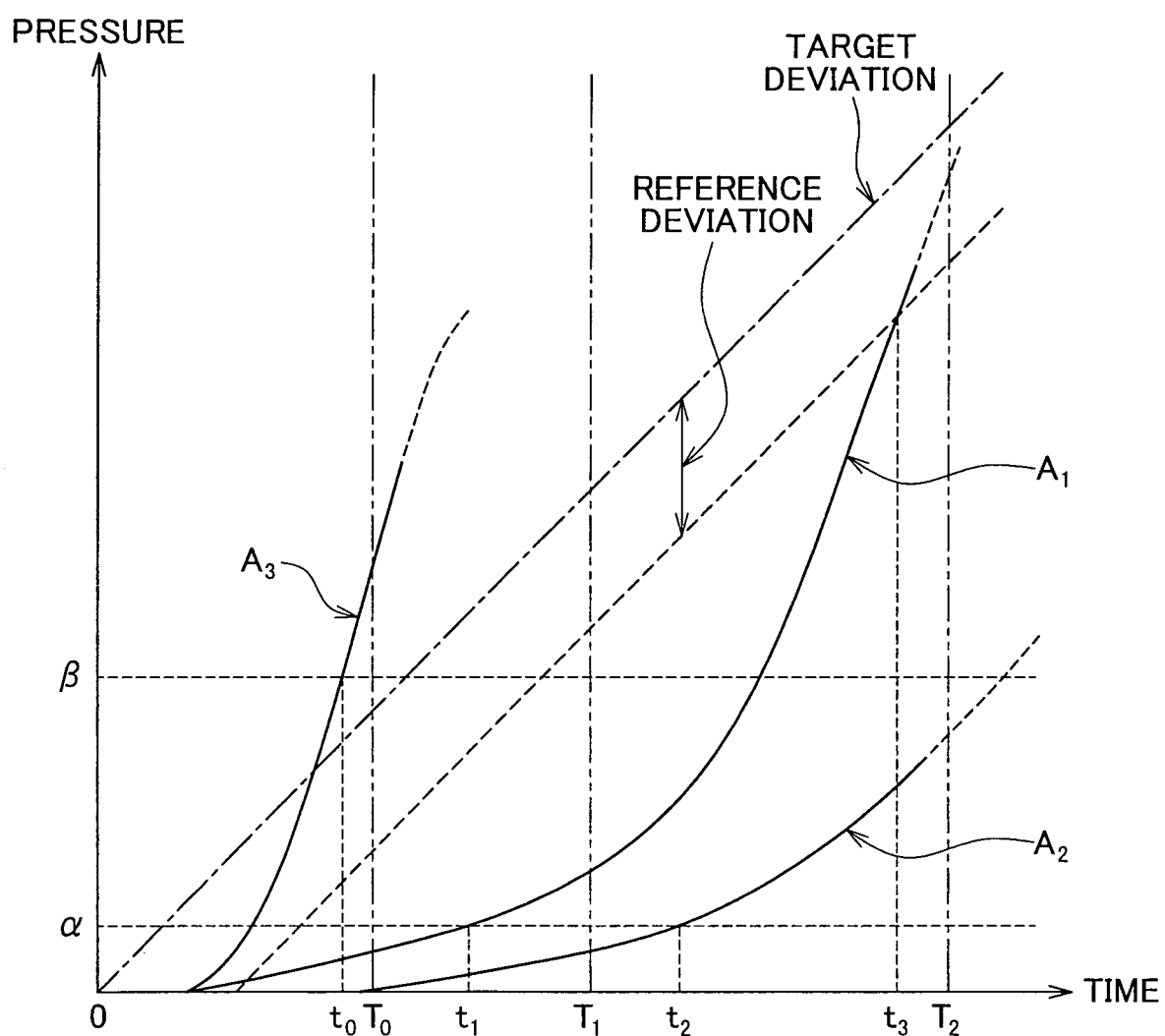
FIG. 3 is a graph showing hydraulic pressures that are applied to a wheel cylinder after a braking instruction is issued.

FIG. 3 is a graph showing hydraulic pressures that are applied to a wheel cylinder after a braking instruction is issued. The ordinate axis indicates the difference between the control hydraulic pressure and the atmospheric pressure, and the abscissa axis indicates the time that has elapsed since a braking instruction is issued. FIG. 3 shows manners in which the control hydraulic fluid responds to the control in an early stage immediately after a braking instruction is issued. FIG. 3 shows an example of an initial response A1 that indicates the manner in which the control hydraulic fluid responds to the control in the normal state, an example of an initial response A2 that indicates the manner in which the control hydraulic fluid responds to the control in the case of an abnormally-quick response, and an example of an initial response A3 that indicates the manner in which the control hydraulic fluid responds to the control in the case of an abnormally-slow response. In FIG. 3, the target hydraulic pressure is indicated by an alternate long and short dashed line, and increases with time after a braking instruction is issued. In FIG. 3, the target hydraulic pressure linearly increases. However, this is merely one example. An abnormally-abnormally-slow response determination reference pressure α and an abnormally-quick response determination reference pressure β are indicated by dashed lines. Abnormally-quick response determination reference time T0, abnormally-slow response determination reference time T1, and poor control determination time T2 are indicated by alternate long and two short dashed lines.

The control hydraulic pressure indicated by the initial response A1 in the normal state (hereinafter, simply referred to as "initial response A 1") reaches the abnormally-slow response determination reference pressure α before the abnormally-slow response determination reference time T1 has elapsed since a braking instruction is issued, more specifically, when time t1 has elapsed since the braking instruction is issued. The control hydraulic pressure indicated by the initial response A1 continuously increases even after time t1, and is higher than the abnormally-slow response determination reference pressure α when the abnormally-slow response determination reference time T1 has elapsed since the braking instruction is issued. If the control hydraulic pressure reaches the abnormally-slow response determination reference pressure α before the abnormally-slow response determination reference time T1 has elapsed since the braking instruction is issued, it is not determined that an abnormally-slow response has occurred.

The control hydraulic pressure is detected by the control pressure sensor 73. The abnormally-slow response determination reference pressure α is set in advance as a threshold value that is used to determine whether the control hydraulic pressure rises properly, and stored in the brake ECU 70. The abnormally-slow response determination reference pressure α is set to, for example, approximately 0.5 MPa to 1.0 MPa in the first embodiment of the invention. The abnormally-slow response determination reference time T1 is set in advance as a threshold value that is used to determine whether the control hydraulic pressure responds to the control abnormally slowly, and stored in the brake ECU 70. Counting of the abnormally-slow response determination reference time T1 is started when a braking instruction is issued. The abnormally-slow response determination reference time T1 is set to end before the poor control determination time T2, described later in detail, ends. Preferably, the abnormally-slow response determination reference time T1 and the abnormally-slow response determination reference pressure α are set to appropriate values, for example, by experiment.

The deviation of the control hydraulic pressure indicated by the initial response A1 from the target hydraulic pressure falls below the reference deviation when time t3 has elapsed since the braking instruction is issued, and then comes closer to the target hydraulic pressure. That is, the deviation of the control hydraulic pressure indicated by the initial response A1 from the target hydraulic pressure when the poor control determination time T2 has elapsed since the braking instruction is issued is smaller than the reference deviation. If the deviation of the control hydraulic pressure from the target hydraulic pressure falls below the reference deviation before the poor control determination time T2 has elapsed since the braking instruction is issued, it is not determined that the poor control has occurred.

The reference deviation may be set to a constant value, or may be set to a value obtained by multiplying the target hydraulic pressure by a predetermined ratio. In the first embodiment of the invention, the reference deviation is set to a constant value, for example, 1 MPa. The poor control determination time T2 is set in advance as a threshold value that is used to determine whether poor control over the control hydraulic pressure has occurred, and stored in the brake ECU 70.

The control hydraulic pressure indicated by the initial response A2 in the case of abnormally-slow response (hereinafter, simply referred to as "initial response A2") reaches the abnormally-slow response determination reference pressure α when time t2 has elapsed since the braking instruction is issued. Time t2 ends after the abnormally-slow response determination reference time T2 ends, and the control hydraulic pressure indicated by the initial response A2 has not reached the abnormally-slow response determination reference pressure α when the abnormally-slow response determination reference time T1 has elapsed since the braking instruction is issued. In this case, it is determined that an abnormally-slow response has occurred.

The control hydraulic pressure indicated by the initial response A3 in the case of abnormally-quick response is already beyond the target hydraulic pressure and reaches the abnormally-quick response determination reference pressure β when time t0 has elapsed since the braking instruction is issued. Then, the control hydraulic pressure continuously increases, and is higher than the abnormally-quick response determination reference pressure β when the abnormally-quick response determination reference time T0 has elapsed since the braking instruction is issued. If the control hydraulic pressure abruptly increases and is higher than the abnormally-quick response determination reference pressure β when the abnormally quick-response determination reference time T0 has elapsed since the braking instruction is issued, it is determined that an abnormally-quick response has occurred.

Preferably, the abnormally-slow response determination reference pressure is set to a value that is higher than the target hydraulic pressure which is used when the abnormally-quick response determination reference time T0 has elapsed since the braking instruction is issued, for example, approximately 3 MPa to approximately 4 MPa. Immediately after a braking instruction is issued, the control hydraulic pressure rarely exceeds the target hydraulic pressure. Therefore, it may be determined that an abnormally-quick response has occurred if the control hydraulic pressure is higher than the target hydraulic pressure immediately after the braking instruction is issued, that is, when the abnormally-quick response determination reference time T0 has elapsed since the braking instruction is issued. The abnormally-quick response determination reference time T0 is set to end before the abnormally-slow response determination reference time T1 ends. In this way, an abnormally-quick response of the control hydraulic pressure is detected before an abnormally-slow response of the control hydraulic pressure is detected. Therefore, it is possible to more promptly suppress generation of an excessive braking force that is excessively larger than the required braking force.

Figure 4:
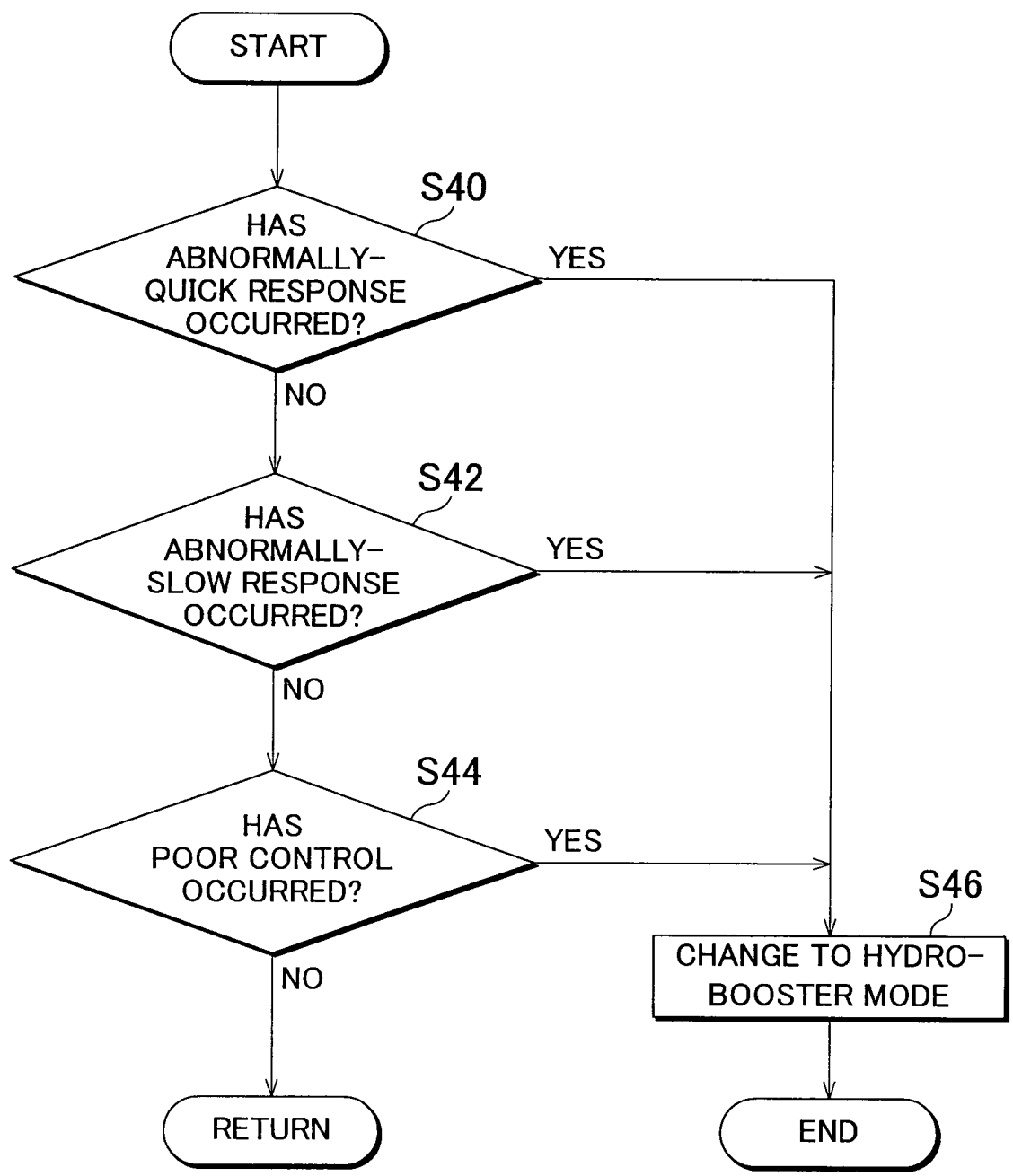
FIG. 4 is a flowchart describing a control hydraulic pressure abnormal response determination routine in S26.

FIG. 4 is a flowchart describing the control hydraulic pressure abnormal response determination routine that is executed in S26. When the control hydraulic pressure abnormal response determination routine in S26 is started, first, the brake ECU 70 determines whether an abnormally-quick response has occurred (S40). That is, the brake ECU 70 determines whether the control hydraulic pressure exceeds the abnormally-quick response determination reference pressure β before the abnormally-quick response determination reference time T0 elapses after the braking instruction is issued. If it is determined that the control hydraulic pressure is lower than the abnormally-quick response determination reference pressure β, the brake ECU 70 determines that an abnormally-quick response has not occurred ("NO" in S40), and then determine whether an abnormally-slow response has occurred (S42). On the other hand, if it is determined that the control hydraulic pressure is higher than the abnormally-quick response determination reference pressure β, the brake ECU 70 determines that an abnormally-quick response has occurred ("YES" in S40). If it is determined that an abnormally-quick response has occurred, the brake ECU 70 ends the cooperative braking control and change the control mode to the hydro-booster mode (S46), after which the control hydraulic pressure abnormal response determination routine in S26 ends.

Next, the brake ECU 70 determines whether an abnormally-slow response has occurred (S42). That is, the brake ECU 70 determines whether the control hydraulic pressure reaches the abnormally-slow response determination reference pressure α before the abnormally-slow response determination reference time T1 elapses after the braking instruction is issued. If it is determined that the control hydraulic pressure has reached the abnormally-slow response determination reference pressure α before the abnormally-slow response determination reference time T1 elapses after the braking instruction is issued, the brake ECU 70 determines that an abnormally-slow response has not occurred ("NO" in S42), and then determines whether poor control has occurred (S44). If it is determined that the control hydraulic pressure has not reached the abnormally-slow response determination reference pressure α even if the abnormally-slow response determination reference time T1 has elapsed since the braking instruction is issued, the brake ECU 70 determines that an abnormally-slow response has occurred ("YES" in S42). If it is determined that an abnormally-slow response has occurred, the brake ECU 70 ends the cooperative braking control and change the control mode to the hydro-booster mode (S46), after which the control hydraulic pressure abnormal response determination routine in S26 ends.

The brake ECU 70 determines whether the poor control has occurred (S44). That is, the brake ECU 70 determines whether the deviation of the control hydraulic pressure from the target hydraulic pressure falls below the reference deviation before the poor control determination time T2 elapses after the braking instruction is issued. If it is determined that the deviation falls below the reference deviation before the poor control determination time T2 elapses after the braking instruction is issued, the brake ECU 70 determines that the poor control has not occurred ("NO" in S44), and executes the routine shown in FIG. 2 again. If it is determined that the deviation of the control hydraulic pressure from the target hydraulic pressure is still larger than the reference deviation even when the poor control determination time T2 has elapsed since the braking instruction is issued, the brake ECU 70 determines that the poor control has occurred ("YES" in S44). If it is determined that the poor control has occurred, the brake ECU 70 ends the cooperative braking control and change the control mode to the hydro-booster mode (S46), after which the control hydraulic pressure abnormal response determination routine in S26 ends.

In the brake control apparatus 20 according to the first embodiment of the invention, when the pressure of the brake fluid is controlled by the pressure control mechanism as in the cooperative braking control mode, the master cut valve 64 and the regulator cut valve 65 are closed and the partition valve 60 is opened. If an abnormal condition is detected in the control over the pressure of the brake fluid executed by the pressure control mechanism, the control mode is changed to the hydro-booster mode, and the master cut valve 64 and the regulator cut valve 65 are opened and the partition valve 60 is closed. Thus, the braking forces that are applied to the wheels are controlled.

In the hydro-booster mode, if the partition valve 60 is closed, the flow of the hydraulic fluid from the first hydraulic circuit to the second hydraulic circuit through the main passage 45 is shut off. Therefore, the pressure in the first hydraulic circuit tends to be high. Therefore, for example, when the brake fluid is pressurized in the master cylinder unit 10 in accordance with the operation performed by the driver and an excessive pressure, which exceeds the withstanding pressure limit for the control pressure sensor 73 connected to the first hydraulic circuit, is generated, a malfunction may occur in the control pressure sensor 73.

Therefore, the brake control apparatus 20 according to the first embodiment of the invention includes suppression means for suppressing an increase in the pressure in the first passage 45*a* of the first hydraulic circuit, to which the control pressure sensor 73 is connected, when the pressure detected by the control pressure sensor 73 is equal to or higher than a predetermined value while the partition valve 60 is closed. Thus, if the pressure detected by the control pressure sensor 73 is equal to or higher than the predetermined pressure while the partition valve 60 is closed, it is possible to suppress an increase in the pressure in the first passage 45*a* of the first hydraulic circuit, to which the control pressure sensor 73 is connected.

The suppression means according to the first embodiment of the invention includes the master cut valve 64 that is arranged in the master passage 61 between the master cylinder unit 10 and the control pressure sensor 73, and the brake ECU 70 that compares the value detected by the control pressure sensor 73 with a predetermined value, and that closes the master cut valve 64 when the detected value is equal to or higher than the predetermined value.

Protection of Sensor Using Master Cut Valve

Figure 5:
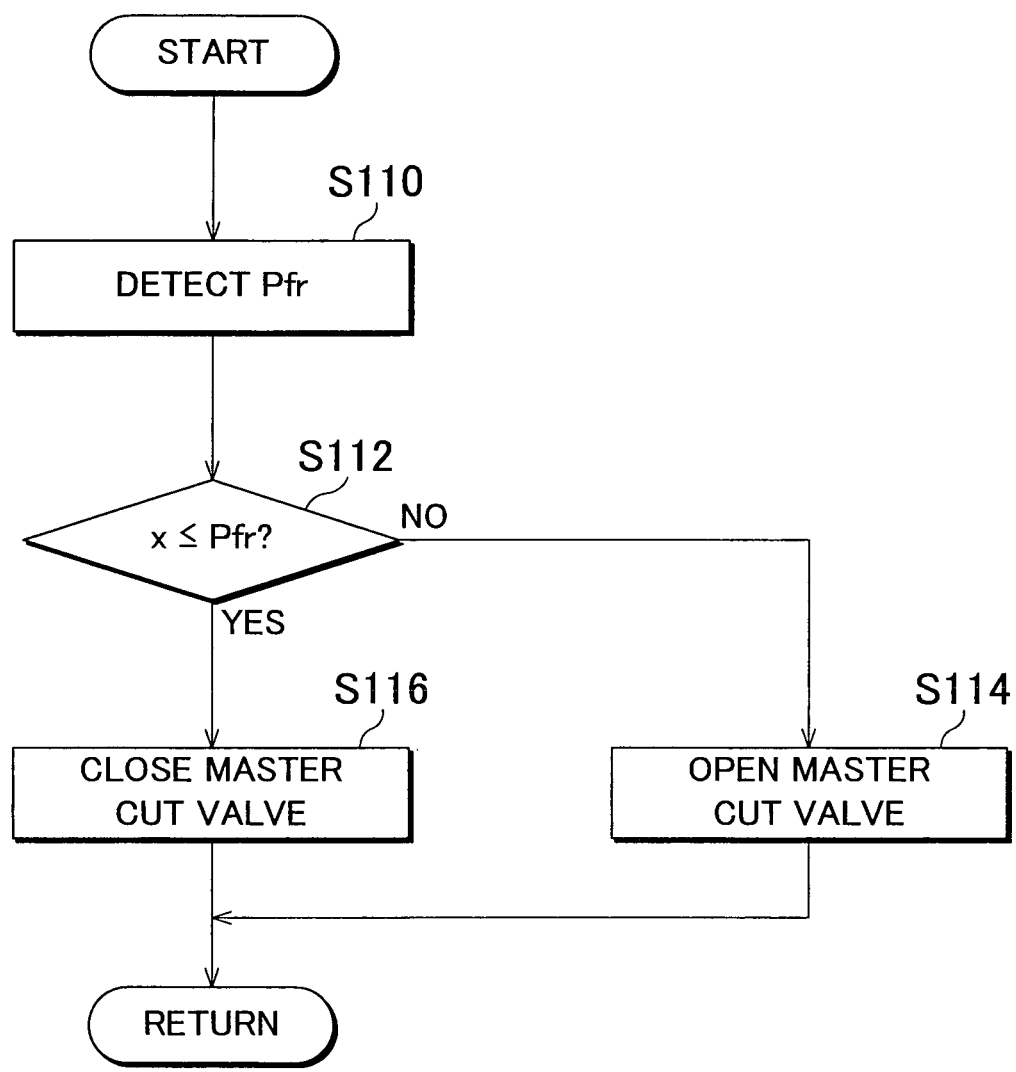
FIG. 5 is a flowchart describing a routine for protecting a control pressure sensor when the hydraulic pressure increases in a hydro-booster mode according to the first embodiment of the invention.

Hereinafter, a control method for protecting the control pressure sensor 73 from an excessive increase in the hydraulic pressure by opening and closing the master cut valve 64 will be described with reference to a flowchart. FIG. 5 is a flowchart describing a routine for protecting the control pressure sensor from an increase in the hydraulic pressure in the hydro-booster mode according to the first embodiment of the invention.

In the brake control apparatus 20 described above, the control mode is changed to the hydro-booster mode, when a malfunction is detected by executing S12 and S16 in FIG. 2 and S40, S42, and S44 in FIG. 4. In the brake control apparatus 20, when the control mode is changed to the hydro-booster mode by executing the routines shown in FIG. 2 and FIG. 4, the brake ECU 70 closes the pressure-decreasing linear control valve 67 and the partition valve 60, and opens the master cut valve 64 and the regulator cut valve 65. In this state, a routine in FIG. 5 is started in response to an input of a signal related to an operation of the brake pedal 24 into the brake ECU 70, for example, an input of a signal from the stroke sensor 25 into the brake ECU 70.

The brake ECU 70 receives a detection value Pfr from the control pressure sensor 73, which indicates the pressure in the wheel cylinders 23FL and 23FR (S110), and compares the detection value Pfr with a predetermined value x (S112). If the detection value Pfr is lower than the predetermined value x ("NO" in S112), the routine ends with the master cut valve 64 kept open (S114) because an excessive pressure, for example, a detection upper limit pressure value y, is not applied to the control pressure sensor 73 (S114).

On the other hand, if the detection value Pfr is equal to or higher than the predetermined value x ("YES" in S112), the master cut valve 64 is closed (S116) because there is a high possibility that an excessive pressure corresponding to the detection upper limit pressure value y will be applied to the control pressure sensor 73 (S116), after which the routine ends. According to this routine, because the master cut valve 64 is closed when the detection value Pfr from the control pressure sensor 73 is equal to or higher than the predetermined value x, the brake fluid that is pressurized in the master cylinder unit 10 no longer flows into the first passage 45*a* that is positioned downstream of the master cut valve 64. Therefore, an increase in the pressure in the first passage 45*a* is suppressed. Therefore, in the brake control apparatus 20, the control pressure sensor 73 is protected from an increase in the pressure when the pressure is increased in the hydro-booster mode, and occurrence of a malfunction in the control pressure sensor 73 is suppressed. The predetermined value x is a value that corresponds to a pressure lower than the detection upper limit pressure value y for the control pressure sensor 73 by approximately 1 MPa. Thus, it is possible to more reliably suppress occurrence of a malfunction in the control pressure sensor 73. The predetermined value that is stored in a storage unit may be the detection upper limit pressure value y for the control pressure sensor 73.

Routine for Opening Closed Master Cut Valve

Figure 6:
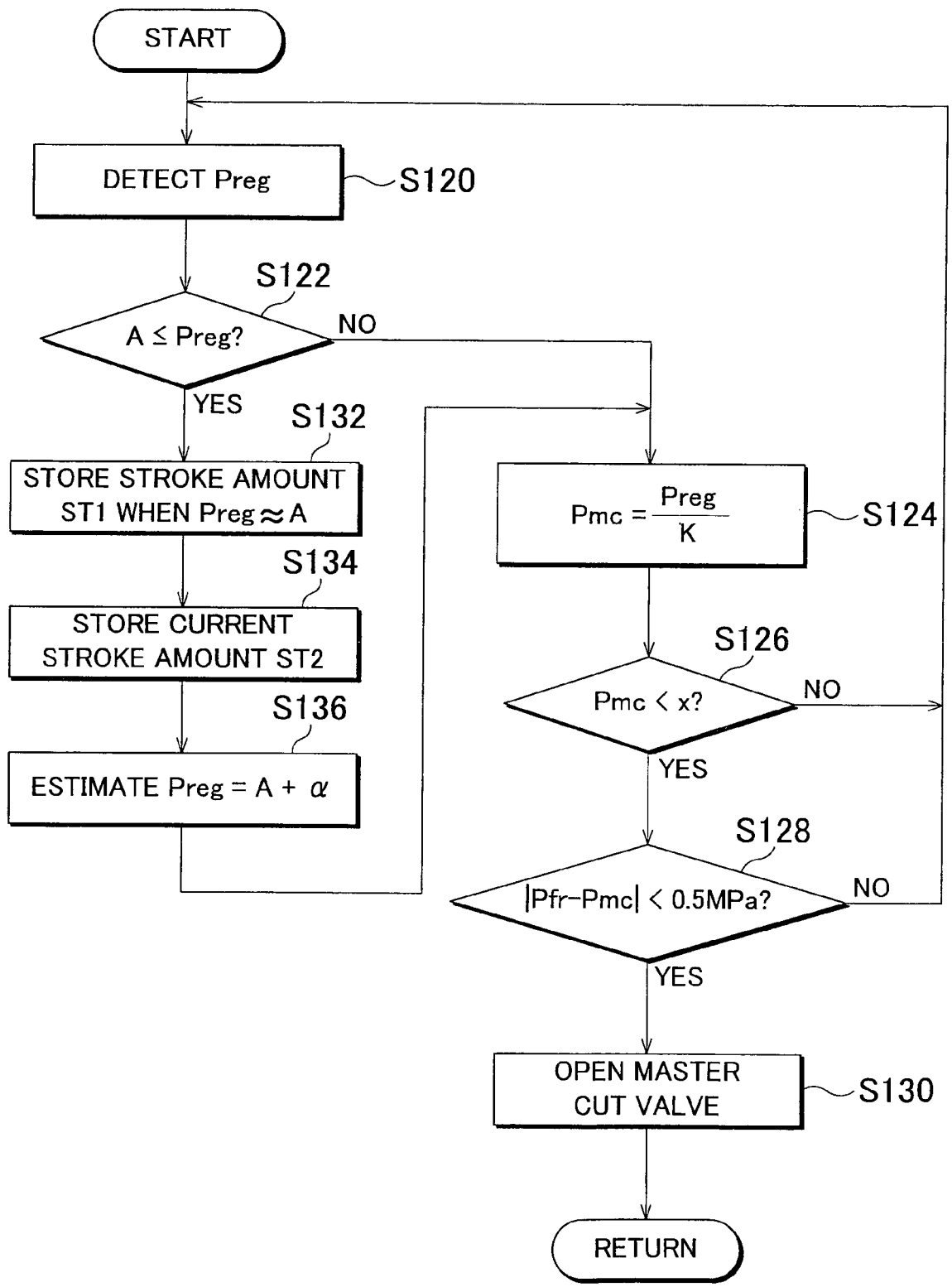
FIG. 6 is a flowchart describing a routine for opening a master-cut valve when the pressure decreases in the hydro-booster mode according to the first embodiment of the invention.

Next, description will be provided concerning a routine for opening the master cut valve when an operation of the brake pedal 24 is ended while the master cut valve 64 is kept closed to protect the control pressure sensor 73 by executing the routine described above. FIG. 6 is a flowchart describing the routine for opening the master cut valve when the pressure is decreased in the hydro-booster mode according to the first embodiment of the invention.

When the master cut valve 64 is kept closed in order to protect the control pressure sensor 73, the passage downstream of the master cut valve 64 is closed and the pressure in the passage including the first passage 45*a* and the individual passages 41 and 42 is maintained constant. The pressure in the master passage 61 positioned upstream of the master cut valve 64 changes in accordance with the operation amount of the brake pedal 24. However, when the master cut valve 64 is kept closed, the pressure at a position upstream of the master cut valve 64 cannot be accurately detected by the control pressure sensor 73. Therefore, if the master cut valve 64 is opened while the pressure difference between the upstream side and the downstream side of the closed master cut valve 64 is large, the brake fluid moves abruptly, which may cause vibration due to pulsation of the brake fluid.

Therefore, in the following routine, the pressure generated in the master passage 61 is estimated using the value detected by the regulator pressure sensor 71 and a predetermined ratio between the master cylinder pressure and the regulator pressure. Thus, it is possible to open the closed master cut valve at appropriate timing.

The routine shown in FIG. 6 is started while the master cut valve 64 is closed when the pressure is increased in the hydro-booster mode. The brake ECU 70 receives the value detected by the regulator pressure sensor 71 (S120), and compares the regulator pressure Preg with a predetermined value A (S122). The predetermined value A is set to a value that indicates the detection upper limit pressure. The detection upper limit pressure is the upper limit of the pressure which can be accurately detected by the regulator pressure sensor 71. If the regulator pressure Preg is lower than the predetermined value A ("NO" in S122), it is possible to estimate the pressure in the master passage 61 that is positioned upstream of the master cut valve 64 based on the regulator pressure Preg and a servo-ratio K which is a predetermined ratio between the master cylinder pressure and the regulator pressure.

More specifically, a master cylinder pressure Pmc that is substantially equal to the pressure in the master passage 61 is calculated based on the regulator pressure Preg that is calculated using the value detected by the regulator pressure 71 according to the equation, Pmc=Preg/K (S124). The brake ECU 70 compares the master cylinder pressure Pmc with the predetermined value x, which is used as the threshold value used to determine whether the master cut valve is closed in FIG. 5 (S126). If the master cylinder pressure Pmc is equal to or higher than the predetermined value x ("NO" in S126), there is a high possibility that high-pressure brake fluid will flow into the first passage 45*a* if the master cut valve 64 is opened. Therefore, S120 is executed again with the master cut valve 64 kept closed.

On the other hand, if the master cylinder pressure Pmc is lower than the predetermined value x ("YES" in S126), the brake ECU 70 determines whether the pressure difference between the upstream side and the downstream side of the master cut valve 64 is within a predetermined range. More specifically, the brake ECU 70 compares the master cylinder pressure Pmc, which indicates the pressure upstream of the master cut valve 64, with the detection value Pfr, which indicates the pressure downstream of the master cut valve 64, and determines whether the difference between the master cylinder pressure Pmc and the detection value Pfr is smaller than 0.5 MPa (S128). When the difference between the master cylinder pressure Pmc and the detection value Pfr from the control pressure sensor 73 is smaller than 0.5 MPa ("YES" in S128), the brake ECU 70 opens the master cut valve 64 (S130). Thus, in the brake control apparatus 20, when the master cut valve 64, which has been closed to protect the control pressure sensor 73, is opened, it is possible to suppress occurrence of abrupt movement of the hydraulic fluid due to the pressure difference between the upstream side and the downstream side of the master cut valve 64. Therefore, it is possible to suppress vibration due to pulsation of the brake fluid.

Next, description will be provided concerning a case in which the pressure in the regulator passage 62 exceeds the detection upper limit pressure for the regulator pressure sensor 71 due to an operation of the brake pedal 24 performed by the driver. If the regulator pressure Preg is equal to or higher than the predetermined value A ("YES" in S122), the brake ECU 70 receives, from the stroke sensor 25, a signal indicating a stroke amount ST1 that is achieved when the regulator pressure Preg detected by the regulator pressure sensor 71 exhibits a value substantially equal to the predetermined value A that is the detection upper limit pressure for the regulator pressure sensor 71, and stores the stroke amount ST1 (S132). The brake ECU 70 also stores a current stroke amount ST2 that is achieved by further depressing the brake pedal 24 from the position corresponding to the stroke amount ST1 (S134).

Then, the brake ECU 70 calculates the regulator pressure Preg that is increased from the detection upper limit pressure A by an amount a based on the stroke amounts ST1 and ST2, etc. More specifically, when the cross section of the master cylinder is S, the brake fluid having a volume V, V=(ST2−ST1)×S, has been compressed since the regulator pressure Preg reaches the detection upper limit pressure A. The brake ECU 70 calculates the pressure α that is an increase from the detection upper limit pressure A with reference to a map that stores the relationship between the decrease V in the volume and the increase a in the pressure, and estimates the regulator pressure Preg. Thus, even if the regulator pressure Preg is higher than the detection upper limit pressure A, it is possible to estimate the regulator pressure Preg based on the stroke amounts ST1 and ST2. Then, S124 and the following steps are executed, and the master cut valve is opened on an as-required basis.

Forcible Ending of Sensor Protection

In the brake control apparatus 20, even when the master cut valve 64 is closed in order to protect the control pressure sensor 73, a sufficient pressure is generated in the wheel cylinders 23 by executing the above-described routines. However, the temperature of a rotor or a caliper is excessively increased by continuously performing a braking operation, which may reduce braking force that is applied while the vehicle is traveling. In such a case, it is necessary to execute control for ending protection of the control pressure sensor 73, when necessary, to perform an appropriate braking operation. The control will be described below.

Figure 7:
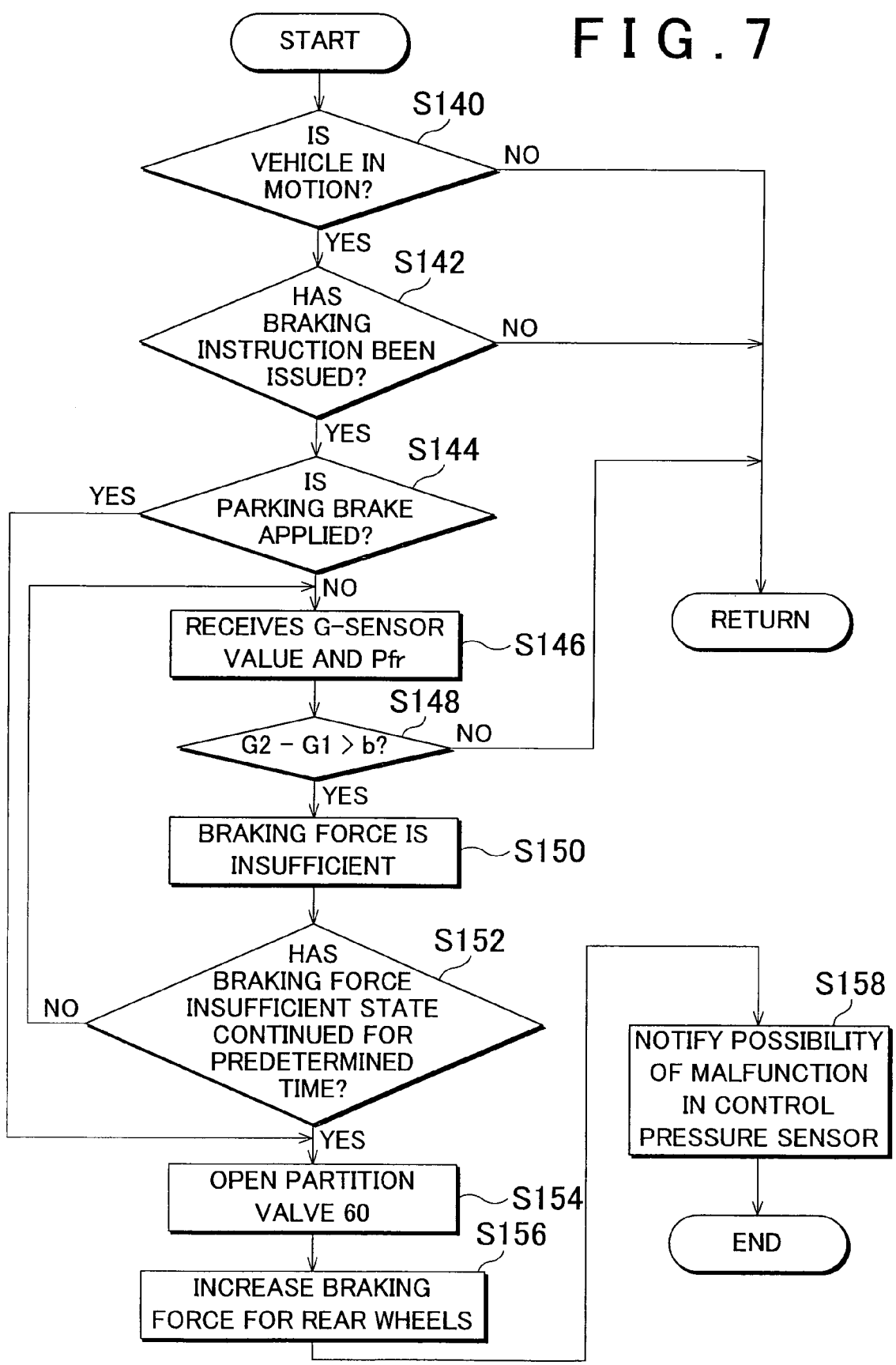
FIG. 7 is a flowchart describing a routine for forcibly ending the sensor protection routine in the hydro-booster mode according to the first embodiment of the invention.

FIG. 7 is a flowchart describing a control routine for forcibly ending the sensor protection routine in the hydro-booster mode according to the first embodiment of the invention. The control routine is executed when each valve of the hydraulic actuator 40 is controlled in such a manner that an excessive pressure is not applied to the control pressure sensor 73.

The brake ECU 70 of the brake control apparatus 20 determines whether the vehicle is in motion based on a value detected by, for example, a wheel speed sensor (not shown) (S140). If it is determined that the vehicle is not in motion ("NO" in S140), further braking operation is not needed. Therefore, the control routine ends. On the other hand, if it is determined that the vehicle is in motion ("YES" in S140), the brake ECU 70 determines in S142 whether a braking instruction has been issued based on values detected by the stroke sensor 25, a stop lamp switch (not shown), etc. If it is determined that a braking instruction has not been issued ("NO" in S142), further braking operation is not needed. Therefore, the control routine ends.

On the other hand, if it is determined that a braking instruction has been issued ("YES" in S142), the brake ECU 70 determines whether a parking brake is applied based on a value detected by a parking brake switch (not shown) (S144). If it is determined that the parking brake has not been applied ("NO" in S144), the brake ECU 70 receives a value detected by a G-sensor (not shown) and the detection value Pfr from the control pressure sensor 73 (S146).

The brake ECU 70 calculates an actual deceleration G1 of the vehicle that is in motion based on a value detected by the G-sensor, calculates an estimated deceleration G2 that is generated by the pressures in the wheel cylinders 23FL and 23FR which are estimated based on the detection value Pfr from the control pressure sensor 73, and compares the actual deceleration G1 with the estimated deceleration G2 (S148). If the difference between the estimated deceleration G2 and the actual deceleration G1 of the vehicle is equal to or smaller than a predetermined threshold value b ("NO" in S148), it is determined that the braking operation is performed properly, and the control routine ends. On the other hand, if the difference between the estimated deceleration G2 and the actual deceleration G1 of the vehicle is larger than the predetermined threshold value b ("YES" in S148), it is determined that required deceleration has not been achieved due to a shortfall in the braking force (S150). Then, it is determined whether the state in which the difference between the estimated deceleration G2 and the actual deceleration G1 of the vehicle is larger than the predetermined threshold value b has continued for a predetermined time or longer (S152). If it is determined that the state has not continued for the predetermined time ("NO" in S152), S146 is executed again. If it is determined this state has continued for the predetermined time or longer ("YES" in S152), the partition valve 60 is opened in order to end the state in which an increase in the pressure in the first passage 45a is suppressed (S154). S154 is executed also when it is determined in S144 that the barking brake is applied ("YES" in S144).

In the brake control apparatus 20, if the partition valve 60 is opened in the state in which an increase in the pressure in the first passage 45a, to which the control pressure sensor 73 is connected, is suppressed by closing the master cut valve 64, the brake fluid in the first passage 45a, of which the pressure has been maintained high, passes through the partition valve 60 and moves to the second passage 45b. Therefore, in the brake control apparatus 20, the pressure in the wheel cylinders 23RR and 23RL for the rear wheels is allowed to increase to increase the braking force that is applied to the rear wheels, and the pressure in the first passage 45a is decreased. Thus, it is possible to avoid the situation in which an excessive pressure is applied to the control pressure sensor 73 (S156).

Instead of or in addition to opening the partition valve 60, the master cut valve 64 may be opened. Thus, in the brake control apparatus 20, if the actual deceleration G1 is smaller than the estimated deceleration G2 and it is determined that required deceleration has not been achieved, the master cut valve 64 is opened to end suppression of an increase in the pressure in order to secure the braking force that is applied to the front wheels more reliably, whereby an increase in the pressure in the wheel cylinders 23FR and 23FL is allowed. Thus, in the vehicle provided with the brake control apparatus 20, a higher pressure is generated in each of the wheel cylinders 23 of the four respective wheels. Therefore, it is possible to secure a sufficient amount of braking force.

Because the control for protecting the control pressure sensor 73 is ended in the control routine described above, it may be considered that the control pressure sensor 73 malfunctions due to an excessive pressure. Therefore, the driver or a worker is notified of the possibility of a malfunction by notification means such as a lamp (S158), after which the routine end.

Second Embodiment of the Invention

Figure 8:
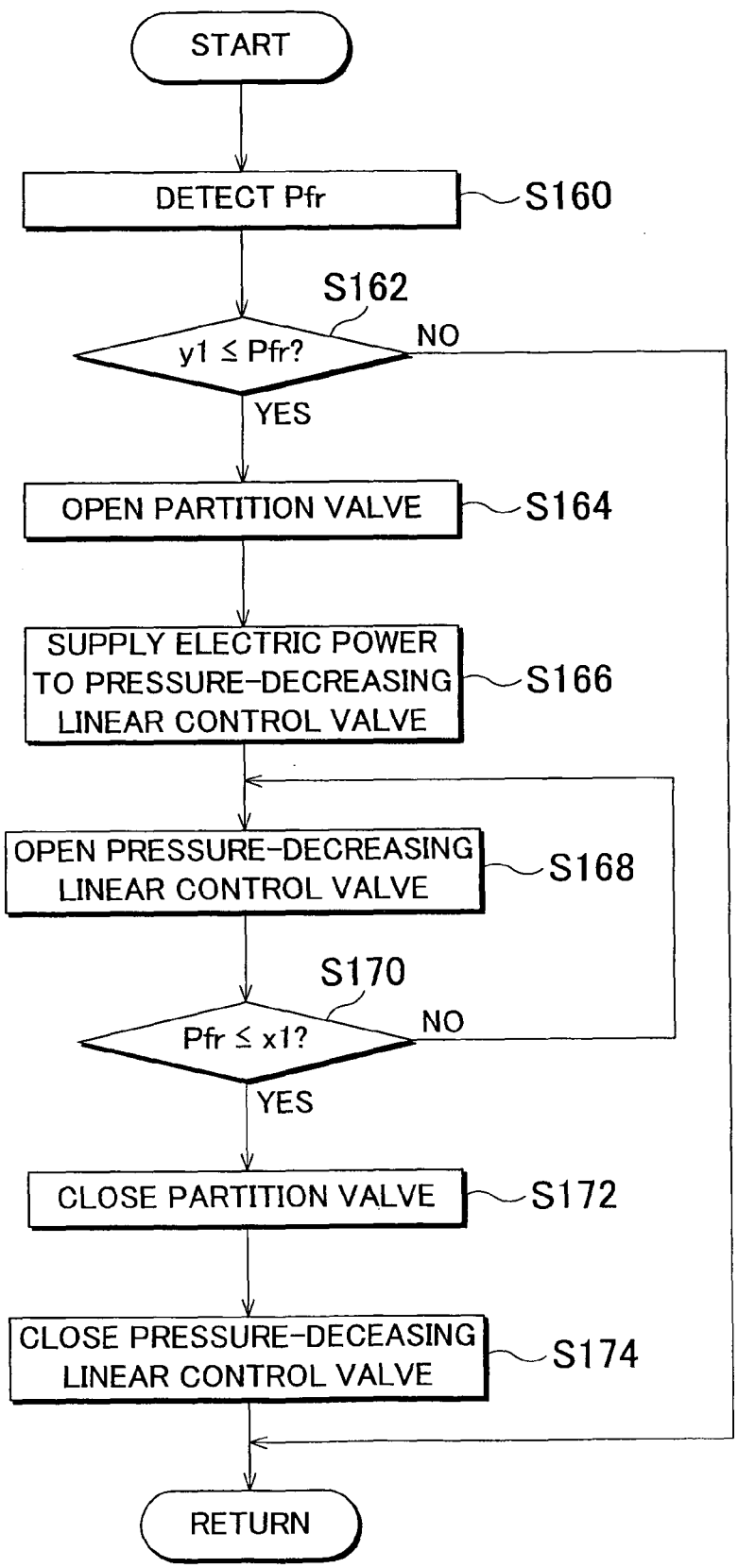
FIG. 8 is a flowchart describing a routine for protecting the control pressure sensor when the pressure increases in the hydro-booster mode according to a second embodiment of the invention.

In a brake control apparatus 20 according to a second embodiment of the invention, if the pressure, which is detected by the control pressure sensor 73 while the partition valve 60 is closed, is equal to or higher than the predetermined value, the partition valve 60 and the pressure-decreasing linear control valve 67 are opened to suppress an increase in the pressure in the first passage 45a to which the control pressure sensor 73 is connected. FIG. 8 is a flowchart describing a control routine for protecting the control pressure sensor when the pressure is increased in the hydro-booster mode according to the second embodiment of the invention. Mainly, the features that differ from those in the first embodiment of the invention will be described below, and description concerning the features that are common to the first embodiment and the second embodiment of the invention will not be provided below.

The brake ECU 70 receives the detection value Pfr from the control pressure sensor 73, which indicates the pressure in the wheel cylinders 23FL and 23FR (S160) while the braking operation is performed in the hydro-booster mode. Then, the brake ECU 70 compares the detection value Pfr with a predetermined value y1 that is slightly lower than the detection upper limit pressure value y (S162). If the detection value Pfr is lower than the predetermined value y1 ("NO" in S162), the control routine ends with the master cut valve 64 kept open because an excessive pressure such as the detection upper limit pressure value y is not applied to the control pressure sensor 73.

On the other hand, if the detection value Pfr is equal to or higher than the predetermined value y1 ("YES" in S162), the brake ECU 70 opens the partition valve 60 (S164), because there is a high possibility that an excessive pressure such as the detection upper limit pressure value y will be applied to the control pressure sensor 73. In addition, the brake ECU 70 supplies an electric current I, with which the pressure-decreasing linear control valve 67 is opened due to the pressure difference, to the pressure-decreasing linear control valve 67 (S166). The pressure in the reservoir pipe 77 at a position downstream of the pressure-decreasing linear control valve 67 matches the atmospheric pressure. The electric current I is set in such a manner that the pressure-decreasing linear control valve 67 is opened due to the pressure difference when the pressure in the second passage 45b is higher than the predetermined value y1.

When the pressure-decreasing linear control valve 67 is opened (S168), the brake fluid in the main passage 45 flows into the reservoir pipe 77 and the pressure in the main passage 45 decreases. According to this control routine, when the detection value Pfr from the control pressure sensor 73 is equal to or higher than the predetermined value y1, the partition valve 60 is opened and the brake fluid in the first passage 45a flows into the second passage 45b. Therefore, an increase in the pressure in the first passage 45a is suppressed. Also, if the pressure in the second passage 45b exceeds the predetermined value y1, the pressure-decreasing linear control valve 67 is opened. Therefore, it is possible to suppress occurrence of the situation in which the pressure in the first passage 45a, to which the control pressure sensor 73 is connected, increases beyond the predetermined value y1.

The brake ECU 70 receives the detection value Pfr from the control pressure sensor 73 again, and compares the detection value Pfr with a predetermined value x1 (S170). The predetermined value x1 is a value that is lower than the predetermined value y1 by approximately 1 MPa. Thus, it is possible to minimize the number of times the pressure-decreasing linear control valve 67 is operated, thereby prolonging the service life of the pressure-decreasing linear control valve 67 and reducing abnormal noise and operating noise. If it is determined that the detection value Pfr is higher than the predetermined value x1 ("NO" in S170), it is determined that the pressure in the first passage 45a is still high, and S168 is continuously executed. On the other hand, if it is determined that the detection value Pfr is equal to or lower than the predetermined value x1 ("YES" in S170), it is determined that an increase in the pressure in the first passage 45a is sufficiently suppressed. Therefore, the partition valve 60 is closed (S172), and electric power supply to the pressure-decreasing linear control valve 67 is ended to close the pressure-decreasing linear control valve 67 (S174).

With this control routine, when the detection value Pfr from the control pressure sensor 73 is equal to or higher than the predetermined value y1, the partition valve 60 and the pressure-decreasing linear control valve 67 are opened. Therefore, even if the brake fluid that is pressurized in the master cylinder unit 10 flows into the first passage 45a, the brake fluid flows into the reservoir pipe 77 via the pressure-decreasing linear control valve 67. Accordingly, an increase in the pressure in the first passage 45a is suppressed. Therefore, in the brake control apparatus 20, it is possible to protect the control pressure sensor 73 from an increase in the pressure when the pressure is increased in the hydro-booster mode, thereby suppressing occurrence of a malfunction in the control pressure sensor 73. In the brake control apparatus 20 according to the second embodiment of the invention, the above-described control routine may be executed using the detection upper limit pressure value y instead of the predetermined value y1.

Third Embodiment of the Invention

In a brake control apparatus 20 according to a third embodiment of the invention, if the pressure that is detected by the control pressure sensor 73 while the partition valve 60 is closed is equal to or higher than a predetermined value, the ABS pressure-decreasing valve 56 is opened to suppress an increase in the pressure in the first passage 45a to which the control pressure sensor 73 is connected. FIG. 9 is a flowchart describing a control routine for protecting the control pressure sensor when the pressure is increased in the hydro-booster mode according to the third embodiment of the invention. Mainly, the features that differ from those in the first and second embodiments of the invention will be described below, and description concerning the features that are common to the third embodiment and the first and second embodiments will not be provided below.

While the braking operation is performed in the hydro-booster mode, the brake ECU 70 receives the detection value Pfr from the control pressure sensor 73, which indicates the pressure in the wheel cylinders 23FL and FR (S180). Then, the brake ECU 70 compares the detection value Pfr with the predetermined value y1 that is slightly lower than the detection upper limit pressure value y (S182). If it is determined that the detection value Pfr is lower than the predetermined value y1 ("NO" in S182), the control routine ends with the master cut valve 64 kept open, because an excessive pressure such as the detection upper limit pressure value y is not applied to the control pressure sensor 73.

On the other hand, if it is determined that the detection value Pfr is equal to or higher than the predetermined value y1 ("YES" in S182), the brake ECU 70 opens the ABS pressure-decreasing valve 56 (S184), because there is a high possibility that an excessive pressure such as the detection upper limit pressure value y will be applied to the control pressure sensor 73.

When the ABS pressure-decreasing valve 56 opens, the brake fluid in the first passage 45a flows into the reservoir passage 55 and the pressure in the first passage 45a decreases. With this control routine, if the detection value Pfr from the control pressure sensor 73 is equal to or higher than the predetermined value y1, the ABS pressure-decreasing valve 56 is opened, and the brake fluid in the first passage 45a flows into the reservoir passage 55. Thus, an increase in the first passage 45a is suppressed.

The brake ECU 70 receives the detection value Pfr from the control pressure sensor 73 again, and compares the detection value Pfr with the predetermined value x1 (S186). The predetermined value x1 is lower than the predetermined value y1 by approximately 1 MPa. Thus, it is possible to minimize the number of times the ABS pressure-decreasing valve 56 is operated, thereby prolonging the service life of the ABS pressure-decreasing valve 56 and reducing abnormal noise and operating noise. If it is determined that the detection value Pfr is higher than the predetermined value x1 ("NO" in S186), it is determined that the pressure in the first passage 45*a* is still high, and S184 is continuously executed. On the other hand, if it is determined that the detection value Pfr is equal to or lower than the predetermined value x1 ("YES" in S186), it is determined that the pressure in the first passage 45*a* is sufficiently suppressed, and the ABS pressure-decreasing valve 56 is closed (S188).

With this control routine, the ABS pressure-decreasing valve 56 is opened when the detection value Pfr from the control pressure sensor 73 is equal to or higher than the predetermined value y1. Therefore, even if the brake fluid that is pressurized in the master cylinder unit 10 flows into the first passage 45*a*, the brake fluid flows into the reservoir passage 55 via the ABS pressure-decreasing valve 56. Accordingly, an increase in the pressure in the first passage 45*a* is suppressed. Therefore, in the brake control apparatus 20, the control pressure sensor 73 is protected from an increase in the pressure when the pressure is increased in the hydro-booster mode, whereby occurrence of a malfunction in the control pressure sensor 73 is suppressed.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A brake control apparatus that controls braking forces which are applied to wheels based on a pressure of hydraulic fluid, comprising:
   a manual hydraulic pressure source that pressurizes hydraulic fluid based on an amount by which a brake operation member is operated by a driver;
   a first hydraulic circuit which connects a first wheel cylinder that applies a braking force to a first wheel to the manual hydraulic pressure source, and in which a passage is formed so that a pressure of the hydraulic fluid in the manual hydraulic pressure source is transferred to the first wheel cylinder;
   a second hydraulic circuit which connects a second wheel cylinder that applies a braking force to a second wheel, which differs from the first wheel, to the manual hydraulic pressure source, and in which a passage is formed so that the pressure of the hydraulic fluid in the manual hydraulic pressure source is transferred to the second wheel cylinder;
   a partition valve that is provided in a main passage which provides communication between the first hydraulic circuit and the second hydraulic circuit;
   a first pressure sensor that detects pressure in the main passage at a position on the first hydraulic circuit side with respect to the partition valve; and
   a suppression device that suppresses an increase in pressure in the passage in the first hydraulic circuit, to which the first pressure sensor is connected, in a mode, in which a hydraulic pressure is generated directly in the wheel cylinders in response to a brake pedal operation performed by the driver, when the pressure detected by the first pressure sensor is equal to or higher than a predetermined value due to hydraulic fluid pressurized by the manual hydraulic pressure source on the basis of an operation of the driver while the partition valve is closed.

2. The brake control apparatus according to claim 1, wherein
   the suppression device includes:
   a first cut valve that is provided in the first hydraulic circuit at a position between the manual hydraulic pressure source and the first pressure sensor; and
   a control unit that compares a detection value that indicates the pressure detected by the first pressure sensor with a predetermined value, and closes the first cut valve when the detection value is equal to or higher than the predetermined value.

3. The brake control apparatus according to claim 2, wherein the control unit includes a storage unit that stores a detection upper limit pressure value for the first pressure sensor as the predetermined value.

4. The brake control apparatus according to claim 1, wherein:
   the manual hydraulic pressure source includes a reservoir that stores the hydraulic fluid; and
   the suppression device includes a pressure-decreasing valve that is provided between the main passage and the reservoir, the partition valve, and a control unit that compares a detection value that indicates the pressure detected by the first pressure sensor with a predetermined value, and that opens the partition valve and the pressure-decreasing valve when the detection value is equal to or higher than the predetermined value.

5. The brake control apparatus according to claim 1, wherein:
   the manual hydraulic pressure source includes a reservoir that stores the hydraulic fluid; and
   the suppression device includes a pressure-decreasing valve that is provided between the first wheel cylinder and the reservoir, and a control unit that compares a detection value that indicates the pressure detected by the first pressure sensor with a predetermined value, and opens the pressure-decreasing valve when the detection value is equal to or higher than the predetermined value.

6. The brake control apparatus according to claim 2, wherein:
   the manual hydraulic pressure source includes a first pressure generation unit that generates a first pressure based on the amount by which the brake operation member is operated, and a second pressure generation unit that generates a second pressure that corresponds to a value obtained by multiplying the first pressure by a predetermined ratio;
   the brake control apparatus further includes a second pressure sensor that is provided in the second hydraulic circuit, and that detects the second pressure, and
   the control unit estimates the first pressure based on a detection value that indicates the second pressure detected by the second pressure sensor and the predetermined ratio, and opens the first cut valve, which has been closed, when a difference between the estimated first pressure and the pressure detected by the first pressure sensor is smaller than a predetermined threshold value.

7. The brake control apparatus according to claim 2, further comprising:

a vehicle deceleration detection device that detects an actual deceleration of a vehicle that is in motion, wherein the control unit ends a state in which the increase in the pressure in the passage in the first hydraulic circuit, to which the first pressure sensor is connected, is suppressed by the suppression device, when a difference between an estimated vehicle deceleration that is estimated based on the pressure detected by the first pressure sensor and the actual deceleration is larger than a predetermined value in the state in which the increase in the pressure in the passage in the first hydraulic circuit, to which the first pressure sensor is connected, is suppressed by the suppression device.

8. The brake control apparatus according to claim 7, wherein the control unit opens the partition valve, which has been closed, to end the state in which the increase in the pressure in the passage in the first hydraulic circuit, to which the first pressure sensor is connected, is suppressed by the suppression device.

9. The brake control apparatus according to claim 7, wherein
the suppression device is the first cut valve, and
the control unit opens the first cut valve, which has been closed, to end the state in which the increase in the pressure is suppressed by the suppression device.

10. The brake control apparatus according to claim 7, further comprising:
a notification device that notifies that a malfunction has occurred in the first pressure sensor, when the state in which the increase in the pressure is suppressed by the suppression device is ended.

11. The brake control apparatus according to claim 2, further comprising:
a second cut valve that is provided in the second hydraulic circuit at a position between the manual hydraulic pressure source and the partition valve; and
a pressure control mechanism that controls a pressure of hydraulic fluid that is transferred to at least one of the first wheel cylinder and the second wheel cylinder independently of an operation of the brake operation member performed by the driver,
wherein
the control unit controls the braking forces that are applied to the wheels by closing the first cut valve and the second cut valve and opening the partition valve when the pressure of the hydraulic fluid is controlled by the pressure control mechanism, and by opening the first cut valve and the second cut valve and closing the partition valve when an abnormal condition is detected in control over the pressure of the hydraulic fluid executed by the pressure control mechanism.

12. The brake control apparatus according to claim 11, wherein the pressure control mechanism includes a power hydraulic pressure source that delivers the hydraulic fluid which is pressurized by supplied drive power independently of the operation of the brake operation member, a pressure-increasing valve that is provided downstream of the power hydraulic pressure source, and a pressure-decreasing valve that is provided downstream of the pressure-increasing valve;
the main passage provides communication between the pressure-increasing valve and the pressure-decreasing valve; and
the control unit suppresses the increase in the pressure in the passage in the first hydraulic circuit, to which the first pressure sensor is connected, by opening the partition valve and the pressure-decreasing valve when the pressure detected by the first pressure sensor is equal to or higher than the predetermined value while the first cut valve and the second cut valve are open and the partition valve is closed so that the braking forces are applied to the wheels using the pressure generated in the manual hydraulic pressure source.

13. A control method for a brake control apparatus that controls braking forces which are applied to wheels based on a pressure of hydraulic fluid, the brake control apparatus including:
a manual hydraulic pressure source that pressurizes hydraulic fluid based on an amount by which a brake operation member is operated by a driver;
a first hydraulic circuit which connects a first wheel cylinder that applies a braking force to a first wheel to the manual hydraulic pressure source, and in which a passage is formed so that a pressure of the hydraulic fluid in the manual hydraulic pressure source is transferred to the first wheel cylinder;
a second hydraulic circuit which connects a second wheel cylinder that applies a braking force to a second wheel, which differs from the first wheel to the manual hydraulic pressure source, and in which a passage is formed so that the pressure of the hydraulic fluid in the manual hydraulic pressure source is transferred to the second wheel cylinder;
a partition valve that is provided in a main passage which provides communication between the first hydraulic circuit and the second hydraulic circuit; and
a first pressure sensor that detects a pressure in the main passage at a position on the first hydraulic circuit side with respect to the partition valve,
the control method comprising:
suppressing an increase in a pressure in the passage in the first hydraulic circuit, to which the first pressure sensor is connected, in a mode, in which a hydraulic pressure is generated directly in the wheel cylinders in response to a brake pedal operation performed by the driver, when the pressure detected by the first pressure sensor is equal to or higher than a predetermined value due to hydraulic fluid pressurized by the manual hydraulic pressure source on the basis of an operation of the driver while the partition valve is closed.

14. The control method according to claim 13, wherein the increase in the pressure in the passage in the first hydraulic circuit, to which the first pressure sensor is connected, is suppressed by shutting off a flow of the hydraulic fluid into the main passage in which the first pressure sensor is arranged, or causing the hydraulic fluid to flow out of the main passage in which the first pressure sensor is arranged.

15. The control method according to claim 13, wherein:
the brake control apparatus further includes a first cut valve that is provided in the first hydraulic circuit at a position between the manual hydraulic pressure source and the first pressure sensor; and
the control method further comprises
comparing a detection value that indicates the pressure detected by the first pressure sensor with a predetermined value; and
closing the first cut valve when the detection value is equal to or higher than the predetermined value.

16. The control method according to claim 15, wherein:
the manual hydraulic pressure source includes a first pressure generation unit that generates a first pressure based on the amount by which the brake operation member is operated, and a second pressure generation unit that generates a second pressure that corresponds to a value obtained by multiplying the first pressure by a predetermined ratio, the brake control apparatus further includes a second pressure sensor that is provided in the second hydraulic circuit, and that detects the second pressure, and the control method further comprises estimating the first pressure based on a value detected by the second pressure sensor and the predetermined ratio; and opening the first cut valve, which has been closed, when a difference between the estimated first pressure and the pressure detected by the first pressure sensor is smaller than a predetermined threshold value.

17. The control method according to claim 13, wherein:

the brake control apparatus further includes a vehicle deceleration detection device that detects an actual deceleration of a vehicle that is in motion; and the control method further comprises ending a state in which the increase in the pressure in the passage in the first hydraulic circuit, to which the first pressure sensor is connected, is suppressed, when a difference between an estimated vehicle deceleration that is estimated based on the pressure detected by the first pressure sensor and the actual deceleration is larger than a predetermined value in the state in which the increase in the pressure in the passage in the first hydraulic circuit, to which the first pressure sensor is connected, is suppressed.

18. The control method according to claim 17, further comprising:

opening the partition valve, which has been closed, to end the state in which the increase in the pressure in the passage in the first hydraulic circuit, to which the first pressure sensor is connected, is suppressed.

19. The control method according to claim 15, wherein:

the brake control apparatus further includes a second cut valve that is provided in the second hydraulic circuit at a position between the manual hydraulic pressure source and the partition valve, and a pressure control mechanism that controls the pressure of the hydraulic fluid that is transferred to at least one of the first wheel cylinder and the second wheel cylinder independently of the operation of the brake operation member performed by the driver; and the control method further comprises controlling the braking forces that are applied to the wheels by closing the first cut valve and the second cut valve and opening the partition valve when the pressure of the hydraulic fluid is controlled by the pressure control mechanism, and by opening the first cut valve and the second cut valve and closing the partition valve when an abnormal condition is detected in control over the pressure of the hydraulic fluid executed by the pressure control mechanism.

20. The brake control method according to claim 19, wherein:

the pressure control mechanism includes a power hydraulic pressure source that derives the hydraulic fluid that is pressurized by supplied drive power independently of the operation of the brake operation member, a pressure-increasing valve that is provided downstream of the power hydraulic pressure source, and a pressure-decreasing valve that is provided downstream of the pressure-increasing valve;

the main passage provides communication between the pressure-increasing valve and the pressure-decreasing valve; and the control method further comprises suppressing the increase in the pressure in the passage in the first hydraulic circuit, to which the first pressure sensor is connected, by opening the partition valve and the pressure-decreasing valve when the pressure detected by the first pressure sensor is equal to or higher than the predetermined value while the first cut valve and the second cut valve are open and the partition valve is closed so that the braking forces are applied to the wheels using the pressure generated in the manual hydraulic pressure source.

* * * * *